United States Patent
Hiromoto

(10) Patent No.: US 8,705,880 B2
(45) Date of Patent: Apr. 22, 2014

(54) IMAGE COMPRESSION DEVICE, IMAGE EXPANSION DEVICE, AND IMAGE PROCESSING APPARATUS

(75) Inventor: Masayuki Hiromoto, Osaka (JP)

(73) Assignee: Panasonic Corporation, Osaka (JP)

( * ) Notice: Subject to any disclaimer, the term of this patent is extended or adjusted under 35 U.S.C. 154(b) by 17 days.

(21) Appl. No.: 13/695,577

(22) PCT Filed: Apr. 12, 2012

(86) PCT No.: PCT/JP2012/002549
§ 371 (c)(1),
(2), (4) Date: Oct. 31, 2012

(87) PCT Pub. No.: WO2013/008370
PCT Pub. Date: Jan. 17, 2013

(65) Prior Publication Data
US 2013/0202219 A1    Aug. 8, 2013

(30) Foreign Application Priority Data

Jul. 13, 2011   (JP) ................. 2011-155253

(51) Int. Cl.
*G06K 9/00*   (2006.01)
*H04N 7/50*   (2006.01)

(52) U.S. Cl.
CPC ..................... *H04N 7/50* (2013.01)
USPC ........... 382/251; 382/232; 382/233; 382/238; 382/239

(58) Field of Classification Search
CPC . H04N 13/0239; H04N 13/0082; H04N 7/50; H04N 7/30; H04N 7/26244; H04N 7/26313; H04N 7/26271; H04N 7/26106; H04N 7/26335; H04N 7/34; H04N 7/26085; H04N 7/267079; G06T 7/0075; G06T 2207/10012; G06T 7/0022; G06T 9/004
USPC ................. 382/154, 232, 233, 238, 239, 251; 341/50, 106; 369/124.06; 348/14.13, 348/14.1, E7.078; 375/E7.04, E7.088
See application file for complete search history.

(56) References Cited

U.S. PATENT DOCUMENTS 4,703,352 A    10/1987  Kondo ..................... 375/240.24
5,892,847 A *  4/1999  Johnson ....................... 382/232

(Continued)

FOREIGN PATENT DOCUMENTS

JP    61-144990    7/1986
JP    2785822      8/1998

(Continued)

OTHER PUBLICATIONS

International Search Report issued Jun. 26, 2012 in corresponding International Application No. PCT/JP2012/002549.

*Primary Examiner* — Anh Do
(74) *Attorney, Agent, or Firm* — Wenderoth, Lind & Ponack, L.L.P.

(57) ABSTRACT

An image compression device which compresses image data, including: a first quantization unit which performs a quantization mode 1 to quantize pixel values using two values A1 and B1 (A1<B1), in one range defined by A1 and B1; a second quantization unit which performs a quantization mode 2 to quantize the pixel values using two values A2 and B2 (A2>B2), in two ranges defined by A2 and B2; and a compressed data generation unit which generates compressed data including a value A, a value B, and quantized values of the pixel values quantized in a selected quantization mode, wherein the compressed data generation unit generates the compressed data using: A1 and B1 as A and B, respectively, when the quantization mode 1 is selected; and A2 and B2 as A and B, respectively, when the quantization mode 2 is selected.

19 Claims, 20 Drawing Sheets

(56) References Cited

U.S. PATENT DOCUMENTS

| | | | |
|---|---|---|---|
| 6,453,073 B2 * | 9/2002 | Johnson | 382/239 |
| 7,636,471 B2 | 12/2009 | Ström et al. | 382/166 |
| 7,657,105 B2 | 2/2010 | Ström | 382/232 |
| 7,693,337 B2 | 4/2010 | Ström et al. | 382/233 |
| 7,734,105 B2 | 6/2010 | Ström et al. | 382/239 |
| 8,126,282 B2 * | 2/2012 | Jung et al. | 382/238 |
| 2007/0019869 A1 | 1/2007 | Ström | 382/233 |
| 2007/0071333 A1 | 3/2007 | Ström et al. | 382/232 |
| 2007/0127812 A1 | 6/2007 | Strom | 382/232 |
| 2007/0140554 A1 | 6/2007 | Ström et al. | 382/166 |

FOREIGN PATENT DOCUMENTS

| | | |
|---|---|---|
| JP | 2003-259368 | 9/2003 |
| JP | 2008-113439 | 5/2008 |
| JP | 4444968 | 3/2010 |

* cited by examiner

IMAGE COMPRESSION DEVICE, IMAGE EXPANSION DEVICE, AND IMAGE PROCESSING APPARATUS

TECHNICAL FIELD

The present invention relates to an image compression device which compresses image data, an image expansion device which expands compressed image data, and an image processing apparatus which includes an image compression device or an image expansion device.

BACKGROUND ART

One typical way of compressing image data is quantization by which pixel values represented with a given number of bits are expressed with a less number of bits. While quantization reduces the amount of data, it causes a quantization error, and thus image compression involves deterioration in image quality.

One conventional image compression technique aiming at reducing such deterioration in image quality utilizes a dynamic range of pixel values (see Patent Literature 1 (PTL 1), for example).

CITATION LIST

Patent Literature

[PTL 1] Japanese Patent No. 2785822

SUMMARY OF INVENTION

Technical Problem

However, the above conventional image compression method has a problem that the quantization error increases with increase in the dynamic range of pixel values included in an image block.

The present invention has been conceived with a view to solving the above conventional problem, and it is an object of the present invention to provide an image compression device, an image expansion device, and an image processing apparatus which, even when the dynamic range is wide, reduce the quantization error while preventing a decrease in the compression rate caused by an increased amount of data.

Solution to Problem

To achieve the above object, an image compression device according to an aspect of the present invention is an image compression device which compresses image data, including: a first quantization unit configured to perform a quantization mode 1 to quantize a plurality of pixel values included in the image data using two values A1 and B1 where A1<B1, in one range defined by the A1 and the B1; a second quantization unit configured to perform a quantization mode 2 to quantize the pixel values using two values A2 and B2 where A2>B2, in two ranges defined by the A2 and the B2; and a compressed data generation unit configured to generate compressed data including a value A, a value B, and quantized values of the pixel values quantized in a selected quantization mode, wherein the compressed data generation unit is configured to generate the compressed data using: the A1 as the A when the quantization mode 1 is selected; the A2 as the A when the quantization mode 2 is selected; the B1 as the B when the quantization mode 1 is selected; and the B2 as the B when the quantization mode 2 is selected.

It is to be noted that the present invention can be implemented not only as such an image compression device, but also as an image expansion device and an image processing apparatus. Furthermore, the present invention can also be implemented as an integrated circuit which includes each processing unit included in the image compression device, the image expansion device, or the image processing apparatus. In addition, the present invention can also be implemented as an image compression method, an image expansion method, or an image processing method which includes, as steps, characteristic processing of each processing unit included in the image compression device, the image expansion device, or the image processing apparatus. Furthermore, the present invention can also be implemented as a program which causes a computer to execute the characteristic processing included in the image compression method, the image expansion method, or the image processing method. Needless to say, such a program can be distributed via a recording medium such as a CD-ROM and a transmission medium such as the Internet.

Advantageous Effects of Invention

Even when the dynamic range is wide, the image compression device according to the present invention can increase the image quality of a compressed image by reducing the quantization error while preventing a decrease in the compression rate caused by an increased amount of data.

DESCRIPTION OF EMBODIMENTS (Underlying Knowledge Forming the Basis of the Present Invention)

The inventor of the present invention has found the following problem with the image compression technique mentioned in [Background Art].

Figure 23:
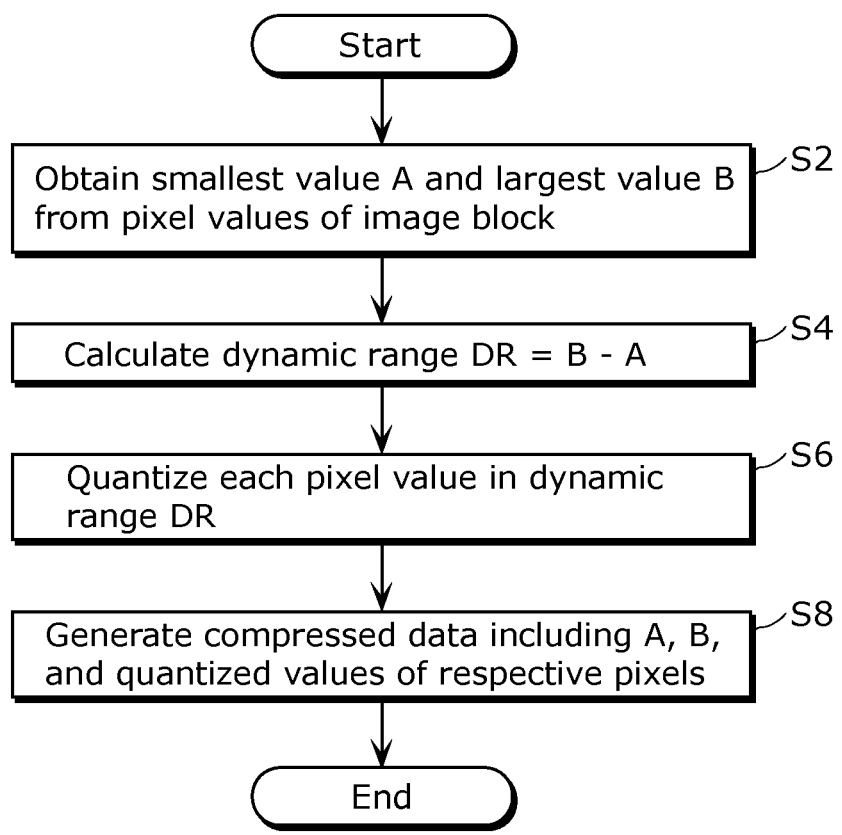
FIG. 23 is a flowchart for describing processing of a conventional image compression method.

FIG. 23 is a flowchart for describing processing of the conventional image compression method disclosed in PTL 1.

As shown in FIG. 23, for each image block including a plurality of pixels, the smallest value A and the largest value B among the pixel values are obtained (S2). Then, as the difference between the largest value B and the smallest value A, a dynamic range DR=B−A is calculated (S4). Then, the dynamic range is divided into $(2^m-1)$ equal ranges and $2^m$ values are assigned to the ranges to quantize the pixel values to m-bit values (S6). Then, compression data is generated which includes two values that are the smallest value A and the largest value B, and the quantized values of the respective pixels.

With this, the method of PTL 1 can reduce the quantization error when the dynamic range is narrow, compared to the case where the quantization is performed on the entire range of the possible pixel values. A typical image has a narrow dynamic range in a local image block, and thus the above method is effective in increasing the image quality in image compression.

However, the above image compression method has a problem that when the dynamic range of pixel values included in an image block is wide, the width of each range resulting from the division of the dynamic range into $(2^m-1)$ equal ranges is large, thereby increasing the quantization error.

In such a case, the quantization error can be reduced by dividing a range in which the quantization is to be performed into a plurality of ranges and performing the quantization only in a range of pixel values indicated by current pixels. However, when a plurality of ranges are used, extra information is necessary for identifying which range the quantized data belongs to, resulting in an increase in the amount of compressed data, leading to a decrease in the compression rate.

The present invention has been conceived with a view to solving the above problems, and it is an object of the present invention to provide an image compression device, an image expansion device, and an image processing apparatus which, even when the dynamic range is wide, reduce the quantization error while preventing a decrease in the compression rate caused by an increased amount of data.

To achieve the above object, the image compression device is an image compression device which compresses image data, including: a first quantization unit configured to perform a quantization mode 1 to quantize a plurality of pixel values included in the image data using two values A1 and B1 where A1<B1, in one range defined by the A1 and the B1; a second quantization unit configured to perform a quantization mode 2 to quantize the pixel values using two values A2 and B2 where A2>B2, in two ranges defined by the A2 and the B2; and a compressed data generation unit configured to generate compressed data including a value A, a value B, and quantized values of the pixel values quantized in a selected quantization mode, wherein the compressed data generation unit is configured to generate the compressed data using: the A1 as the A when the quantization mode 1 is selected; the A2 as the A when the quantization mode 2 is selected; the B1 as the B when the quantization mode 1 is selected; and the B2 as the B when the quantization mode 2 is selected.

With this, the image compression device has a function to perform (i) the quantization mode 1 to quantize a plurality of pixel values in one range and (ii) the quantization mode 2 to group a plurality of pixel values into two ranges and quantize the pixel values in the two ranges. Then, the image compression device generates the compressed data including the value A, the value B, and the quantized values, using: the A1 as the A and the B1 as the B where A1<B1, when the quantization mode 1 is selected; and the A2 as the A and the B2 as the B where A2>B2, when the quantization mode 2 is selected. That is to say, it is possible to identify the selected quantization mode using the two conventionally necessary values of the A and the B, because A<B indicates that the quantization mode 1 has been selected, whereas A>B indicates that the quantization mode 2 has been selected. This makes it possible to use the quantization mode 2 for the quantization in two ranges in addition to the quantization mode 1 equivalent to the conventional technique, without having to add information for distinguishing between the two quantization modes to the compressed data. It is thus possible to perform the image compression in an appropriate quantization mode selected from these two. Moreover, in the case of image data having a wide dynamic range yet having pixel values concentrated in two ranges, the quantization in the quantization mode 2 narrows the width of each range, thereby enabling reduction in the quantization error. As a result, even when the dynamic range is wide, it is possible to reduce the quantization error while preventing a decrease in the compression rate caused by an increased amount of data.

Furthermore, for example, the first quantization unit may be configured to perform the quantization mode 1 to quantize the pixel values in the one range that is a range from the A1 to the B1 inclusive.

With this, the one range defined by the first quantization unit is a range from the A1 to the B1 inclusive. That is to say, the image compression device includes the first quantization unit which quantizes a plurality of pixel values in the range from the A1 to the B1 inclusive when the pixel values are concentrated in that one range. This enables the image compression device to perform the image compression using the two values of the A1 and the B1 when the pixel values are concentrated in that one range.

Furthermore, for example, the second quantization unit may be configured to perform the quantization mode 2 to quantize the pixel values in the two ranges that are (i) a range from 0 to the B2 inclusive and (ii) a range from the A2 to $2^n-1$ inclusive, the pixel values being n-bit values.

With this, the two ranges defined by the second quantization unit are a range from 0 to the B2 inclusive and a range from the A2 to $2^n-1$ inclusive. That is to say, the image compression device includes the second quantization unit which quantizes a plurality of pixel values in the two ranges that are (i) the range from 0 to the B2 inclusive and (ii) the range from the A2 to $2^n-1$ inclusive, when the pixel values are concentrated in these two ranges. This enables the image compression device to perform the image compression using the two values of the A2 and the B2 when the pixel values are concentrated in these two ranges.

Furthermore, for example, the compressed data generation unit may: include a quantization mode selection unit configured to select, between the quantization mode 1 and the quantization mode 2, a quantization mode to be used in the quantization; and be configured to generate the compressed data according to the selected quantization mode.

With this, the image compression device selects, between the quantization mode 1 and the quantization mode 2, a quantization mode to be used in the quantization, and generates the compressed data according to the selected quantization mode. Thus, the image compression device can select an appropriate quantization mode and perform optimal image compression according to the selected quantization mode.

Furthermore, for example, the first quantization unit may be further configured to calculate a quantization error that has occurred in the quantization mode 1, the second quantization unit may be further configured to calculate a quantization error that has occurred in the quantization mode 2, and the quantization mode selection unit may be configured to select, as the quantization mode to be used in the quantization, a quantization mode with a smaller quantization error, based on results of the quantization error calculation by the first quantization unit and the second quantization unit.

With this, the image compression device calculates the quantization error that has occurred in the quantization mode 1 and the quantization mode 2, and selects a quantization mode with a smaller quantization error. With this, even when the dynamic range is wide, it is possible to reduce the quantization error while preventing a decrease in the compression rate caused by an increased amount of data.

Furthermore, for example, the first quantization unit may be further configured to calculate a first range width by subtracting the A1 from the B1, the first range width being a range width in the quantization mode 1, the second quantization unit may be further configured to calculate a second range width by adding the B2 and a value obtained by subtracting the A2 from $2^n-1$ when the pixel values are n-bit pixel values, the second range width being a range width in the quantization mode 2, and the quantization mode selection unit may be configured to select, as the quantization mode to be used in the quantization, a quantization mode corresponding to a smaller one of the first range width and the second range width.

With this, the image compression device calculates the range width in the quantization mode 1 and the range width in the quantization mode 2, and selects the quantization mode corresponding to a smaller range width. Here, the smaller range width means that the pixel values are concentrated in that range. Thus, the quantization in the quantization mode corresponding to the smaller range width enables reduction in the quantization error to a greater extent. Accordingly, even when the dynamic range is wide, it is possible to reduce the quantization error while preventing a decrease in the compression rate caused by an increased amount of data.

Furthermore, for example, the second quantization unit may be configured to calculate, for a plurality of pairs of the A2 and the B2, either the quantization error or the range width in the quantization mode 2, the quantization mode selection unit may be configured to select, as the quantization mode to be used in the quantization, a quantization mode which makes either the quantization error or the range width smallest, based on the result of the calculation by the first quantization unit and results of the calculation performed for the pairs by the second quantization unit, and when the quantization mode 2 is selected, the compressed data generation unit may be configured to generate the compressed data including the A, the B, and the quantized values of the pixel values quantized in the quantization mode 2, using, as the A and the B, the A2 and the B2, respectively, that make either the quantization error or the range width smallest.

With this, the image compression device (i) calculates, for a plurality of pairs of the A2 and the B2, either the quantization error or the range width in the quantization mode 2, (ii) selects, based on the results of the calculation, a quantization mode which makes either the quantization error or the range width smallest, and (iii) generates the compressed data in the selected quantization mode. Here, in the quantization mode 2, the quantization error changes in some cases depending on the pairs of the A2 and the B2. Thus, by calculating the quantization error for the plurality of pairs of the A2 and the B2 in the quantization mode 2, the image compression device can select an optimal quantization mode which reduces the quantization error. With this, even when the dynamic range is wide, it is possible to reduce the quantization error while preventing a decrease in the compression rate caused by an increased amount of data.

Furthermore, for example, the first quantization unit may be configured to perform the quantization mode 1, using, as the A1 and the B1, a smallest pixel value and a largest pixel value among the pixel values, respectively, and the second quantization unit may be configured to perform the quantization mode 2, using, as the B2, a largest pixel value in one of two ranges into which smaller ones of the pixel values are grouped, and using, as the A2, a smallest pixel value in the other range into which larger ones of the pixel values are grouped.

With this, the image compression device performs (i) the quantization mode 1 using, as the A1 and the B1, the smallest value and the largest value among the pixel values, respectively, and (ii) the quantization mode 2 using, as the B2, the largest value among the pixel values in one of two ranges into which smaller pixel values are grouped, and using, as the A2, the smallest value among the pixel values in the other range into which larger pixel values are grouped. This allows each quantization mode to be performed with easy obtainment of the A1, the B1, the A2, and the B2.

Furthermore, for example, the second quantization unit may be configured to assign quantized values to each of the two ranges in which the quantization mode 2 is to be performed, and perform the quantization in each range using the quantized values assigned.

With this, in the quantization mode 2, the image compression device assigns the quantized values to the two ranges and performs the quantization in each range. For example, the image compression device assigns the same quantized values as those in the quantization mode 1 to the two ranges. By doing so, even in the quantization mode 2 in which the range is divided into two, it is possible to perform the quantization using the same quantized values as those in the quantization mode 1 in which the number of ranges is one.

Furthermore, for example, the second quantization unit may be configured to assign the quantized values to each of the two ranges in proportion to widths of the two ranges, and perform the quantization in each range using the quantized values assigned.

With this, in the quantization mode 2, the image compression device assigns the quantized values to the two ranges in proportion to the respective range widths, and performs the quantization in each range. That is to say, the larger the range width, the larger the distribution of the pixel values, and thus the larger the number of quantized values assigned. This equalizes the values of the quantization error between the two ranges, thereby enabling reduction in the quantization error.

Furthermore, for example, the image data may be image data having a plurality of channels, the first quantization unit may be configured to assign, to each of the channels, a given number of bits to be used in the quantization, and perform the quantization in each channel according to the number of bits assigned, and the second quantization unit may be configured to assign, to each of the channels, a given number of bits to be used in the quantization, and perform the quantization in each channel according to the number of bits assigned.

With this, the image data is image data having a plurality of channels, and in the quantization mode 1 and the quantization mode 2, the image compression device assigns, to each of the channels, a given number of bits to be used in the quantization, and performs the quantization in each channel. For example, a given number of bits are assigned according to the amount of data in each channel based on a feature of the image. This makes it possible for the image compression device to equalize the values of the quantization error between the channels, thereby enabling reduction in the quantization error.

Furthermore, for example, the first quantization unit may be configured to assign, to each of the channels, a given number of bits to be used in the quantization, in proportion to a dynamic range width that is a range width in the channel, and perform the quantization in each channel according to the number of bits assigned, and the second quantization unit may be configured to assign, to each of the channels, a given number of bits to be used in the quantization, in proportion to the dynamic range width in the channel, and perform the quantization in each channel according to the number of bits assigned.

With this, in the quantization mode 1 and the quantization mode 2, the image compression device assigns, to each of the channels, a given number of bits to be used in the quantization, in proportion to the dynamic range width in the channel, and performs the quantization in each channel. That is to say, the larger the dynamic range width, the larger the number of quantized values assigned. This makes it possible to equalize the values of the quantization error between the channels, thereby enabling reduction in the quantization error.

Furthermore, for example, for each of image blocks which includes a plurality of pixels included in the image data, the first quantization unit may be configured to perform the quantization mode 1 to quantize the pixel values in the image block, the second quantization unit may be configured to perform, for each image block, the quantization mode 2 to quantize the pixel values, and the compressed data generation unit may be configured to generate the compressed data for each image block.

With this, for each image block, the image compression device performs the quantization mode 1 or the quantization mode 2 and generates the compressed data. That is to say, when the amount of data in the image data is large, the image compression device divides the image data into a plurality of image blocks, and performs the image compression for each image block. This enables the image compression device to perform the image compression on the entire image data even when the amount of data in the image data is large.

Furthermore, to achieve the above object, an image expansion device according to an aspect of the present invention is an image expansion device which expands the compressed data that is image data compressed by the image compression device, the image expansion device including: a quantization mode determination unit configured to determine, between the quantization mode 1 and the quantization mode 2, a quantization mode corresponding to quantized values included in the compressed data, based on a magnitude relationship between the A and the B included in the compressed data; and an inverse quantization unit configured to perform inverse quantization on the quantized values to obtain pixel values, in the determined quantization mode.

With this, the image expansion device determines a quantization mode based on a magnitude relationship between the values A and B included in the compressed data, and performs the inverse quantization corresponding to the determined quantization mode. For example, the image expansion device determines the quantization mode 1 when A<B is true and determines the quantization mode 2 when A>B is true, and performs the inverse quantization accordingly. With this, referring to the values A and B allows the image expansion device to expand the compressed data generated through the compression by the image compression device, to generate the original image data that is the compressed data before compression.

Furthermore, to achieve the above object, an image processing apparatus according to an aspect of the present invention includes: the image compression device; the image expansion device; and an image processing unit configured to transmit image data to the image compression device and receive image data from the image expansion device, wherein the image compression device compresses the image data received from the image processing unit, to generate compressed data, and writes the compressed data to a memory, and the image expansion device reads, from the memory, the compressed data written in the memory, expands the compressed data to generate image data, and transmits the image data to the image processing unit.

With this, the image processing apparatus includes: the image compression device which generates compressed data and writes the compressed data in the memory; the image expansion device which reads the compressed data from the memory and expands the compressed data to generate image data; and the image processing unit which transmits image data to the image compression device and receives image data from the image expansion device. This enables implementation of the image processing apparatus which compresses image data to generate compressed data having a small quantization error while preventing a decrease in the compression rate, and restores the compressed data to the image data.

It is to be noted that the present invention can be implemented not only as the image compression device, the image expansion device, and the image processing apparatus, but also as an integrated circuit which includes each processing unit included in the image compression device, the image expansion device, or the image processing apparatus. In addition, the present invention can also be implemented as an image compression method, an image expansion method, or an image processing method which includes, as steps, characteristic processing of each processing unit included in the image compression device, the image expansion device, or the image processing apparatus. Furthermore, the present invention can also be implemented as a program which causes a computer to execute the characteristic processing included in the image compression method, the image expansion method, or the image processing method. Needless to say, such a program can be distributed via a recording medium such as a CD-ROM and a transmission medium such as the Internet. Moreover, the present invention may be implemented by any combination of the above devices and apparatus, methods, integrated circuit, program, and recording medium.

Hereinafter, an image compression device, an image expansion device, and an image processing apparatus according to an embodiment of the present invention will be described while referring to the drawings. It is to be noted that the following embodiment shows one specific example of the present invention. The numerical values, structural elements, the arrangement and connection of the structural elements, steps, the processing order of the steps etc. shown in the following embodiment are mere examples, and are thus not intended to limit the present invention. Furthermore, among the structural elements described in the following embodiment, those not recited in the independent claims indicating the most generic concept are described as arbitrary structural elements.

(Embodiment)

Figure 1:
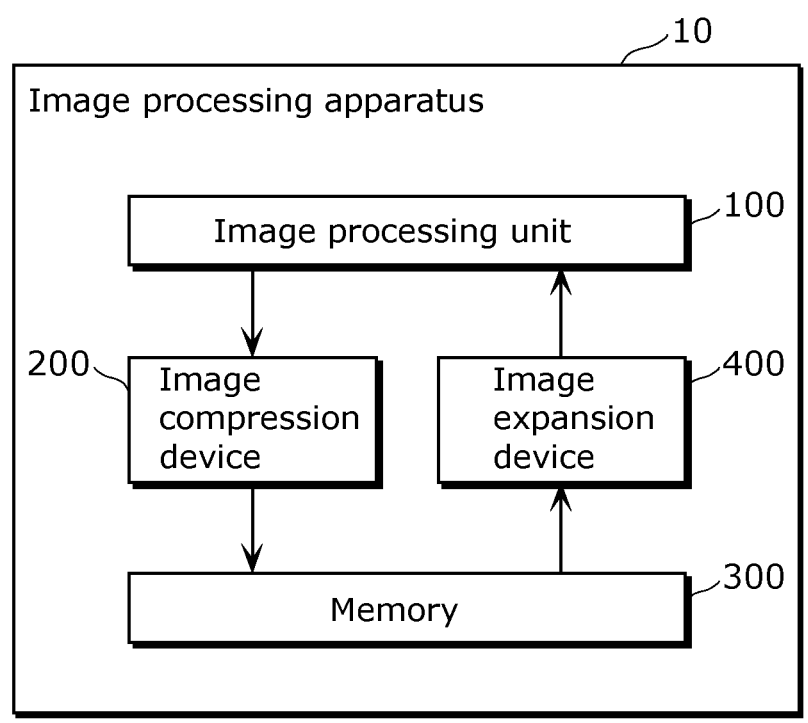
FIG. 1 shows a configuration of an image processing apparatus according to an embodiment of the present invention.

FIG. 1 shows a configuration of an image processing apparatus 10 according to an embodiment of the present invention.

The image processing apparatus 10 is an apparatus which performs predetermined processing on image data, compresses image data to generate compressed data, and expands the compressed data to restore it to the original image data, for instance. For example, the image processing apparatus 10 is a digital image processing appliance such as a television receiver, a recorder, a mobile phone, and a video camera, or is an apparatus built in such a digital image processing appliance. As shown in FIG. 1, the image processing apparatus 10 includes an image processing unit 100, an image compression device 200, a memory 300, and an image expansion device 400.

The image processing unit 100 is a device which performs some kind of processing on image data. An example of the image processing unit 100 in simple form is a device which performs level conversion and filtering, and an example of the image processing unit 100 in complex form is a graphics engine which renders computer graphics.

From and to the memory 300, the image processing unit 100 reads necessary image data and writes image data that is a processing result. More specifically, the image processing unit 100 transmits image data to the image compression device 200 and writes the same to the memory 300, and receives from the image expansion device 400 image data read from the memory 300 and expanded by the image expansion device 400.

The image compression device 200 compresses image data when writing the image data. More specifically, the image compression device 200 compresses the image data received from the image processing unit 100 to generate compressed data, and writes the compressed data in the memory 300.

The memory 300 is a memory in which data such as the compressed data generated by the image compression device 200 is stored. It is to be noted that the memory 300 may be provided outside the image processing apparatus 10 instead of inside the image processing apparatus 10.

The image expansion device 400 expands image data when reading the image data. More specifically, the image expansion device 400 reads, from the memory 300, compressed data written in the memory 300, expands the compressed data to generate image data, and transmits the image data to the image processing unit 100.

Next, the following describes in detail a configuration of the image compression device 200.

Figure 2A:
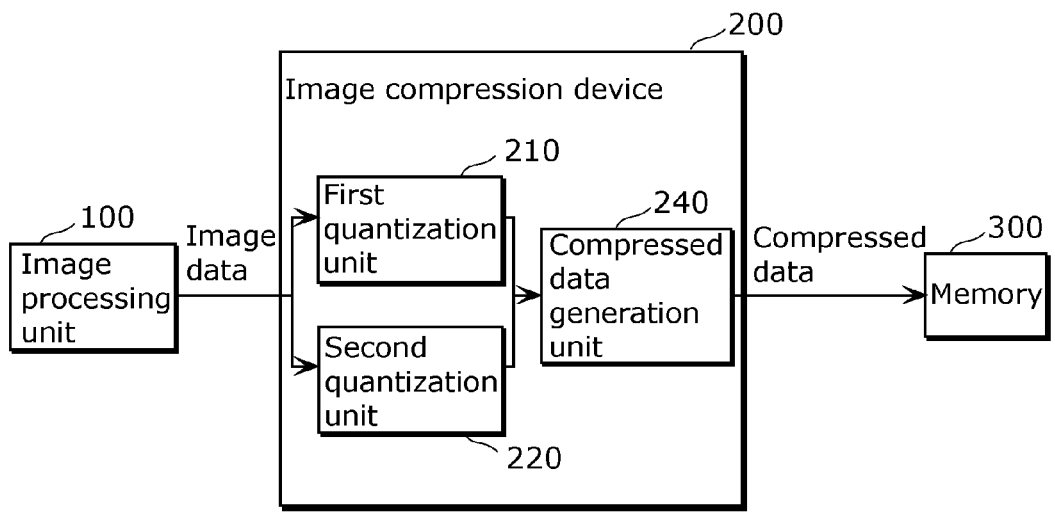
FIG. 2A shows a configuration of an image compression device according to an embodiment of the present invention.
Figure 2B:
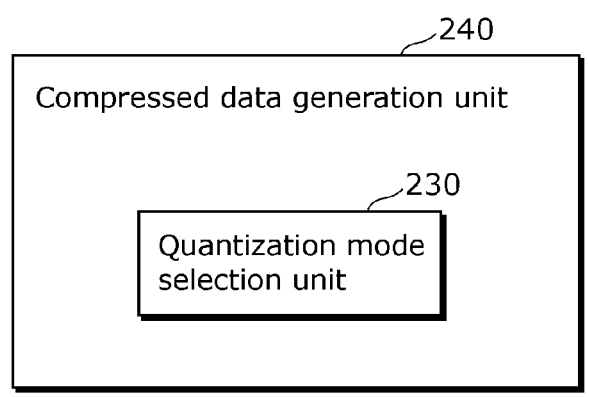
FIG. 2B shows a configuration of a compressed data generation unit according to an embodiment of the present invention.

FIG. 2A shows a configuration of the image compression device 200 according to the present embodiment of the present invention. FIG. 2B shows a configuration of a compressed data generation unit 240 according to the present embodiment of the present invention.

The image compression device 200 is a device which compresses image data. The image compression device 200 compresses image data received from the image processing unit 100 and outputs the compressed data to the memory 300. It is to be noted that in the present embodiment, the image compression device 200 compresses image data for each image block including a plurality of pixels included in the image data. Here, the image block is a block of 4×4=16 pixels, for example.

First, as shown in FIG. 2A, the image compression device 200 includes a first quantization unit 210, a second quantization unit 220, and a compressed data generation unit 240.

The first quantization unit 210 performs a quantization mode 1 to quantize a plurality of pixel values included in image data using two values A1 and B1 where A1<B1, in one range defined by the A1 and the B1. More specifically, in the present embodiment, the first quantization unit 210 performs the quantization mode 1 to quantize, for each image block, a plurality of pixel values in the image block in one range from the A1 to the B1 inclusive.

Furthermore, the first quantization unit 210 calculates a quantization error that has occurred in the quantization mode 1. It is to be noted that a detailed configuration of the first quantization unit 210 will be described later.

The second quantization unit 220 performs a quantization mode 2 to quantize the plurality of pixel values using two values A2 and B2 where A2>B2, in two ranges defined by the A2 and the B2. More specifically, in the present embodiment, the second quantization unit 220 performs the quantization mode 2 to quantize, for each image block, a plurality of n-bit pixel values in the image block in two ranges that are (i) a range from 0 to the B2 inclusive and (ii) a range from the A2 to $2^n-1$ inclusive.

Furthermore, the second quantization unit 220 calculates a quantization error that has occurred in the quantization mode 2. It is to be noted that a detailed configuration of the second quantization unit 220 will be described later.

The compressed data generation unit 240 generates compressed data including a value A, a value B, and quantized values of the pixel values quantized in a selected quantization mode. More specifically, the compressed data generation unit 240 generates the compressed data using: the A1 as the A when the quantization mode 1 is selected; the A2 as the A when the quantization mode 2 is selected; the B1 as the B when the quantization mode 1 is selected; and the B2 as the B when the quantization mode 2 is selected. Then, the compressed data generation unit 240 outputs the compressed data to the memory 300.

Here, as shown in FIG. 2B, the compressed data generation unit 240 includes a quantization mode selection unit 230. That is to say, the compressed data generation unit 240 generates the compressed data for each image block according to a quantization mode selected by the quantization mode selection unit 230.

The quantization mode selection unit 230 selects, between the quantization mode 1 and the quantization mode 2, a quantization mode to be used in the quantization. More specifically, the quantization mode selection unit 230 selects, as the quantization mode to be used in the quantization, a quantization mode with a smaller quantization error, based on results of the quantization error calculation by the first quantization unit 210 and the second quantization unit 220.

Next, the following describes in detail a configuration of the first quantization unit 210.

Figure 3:
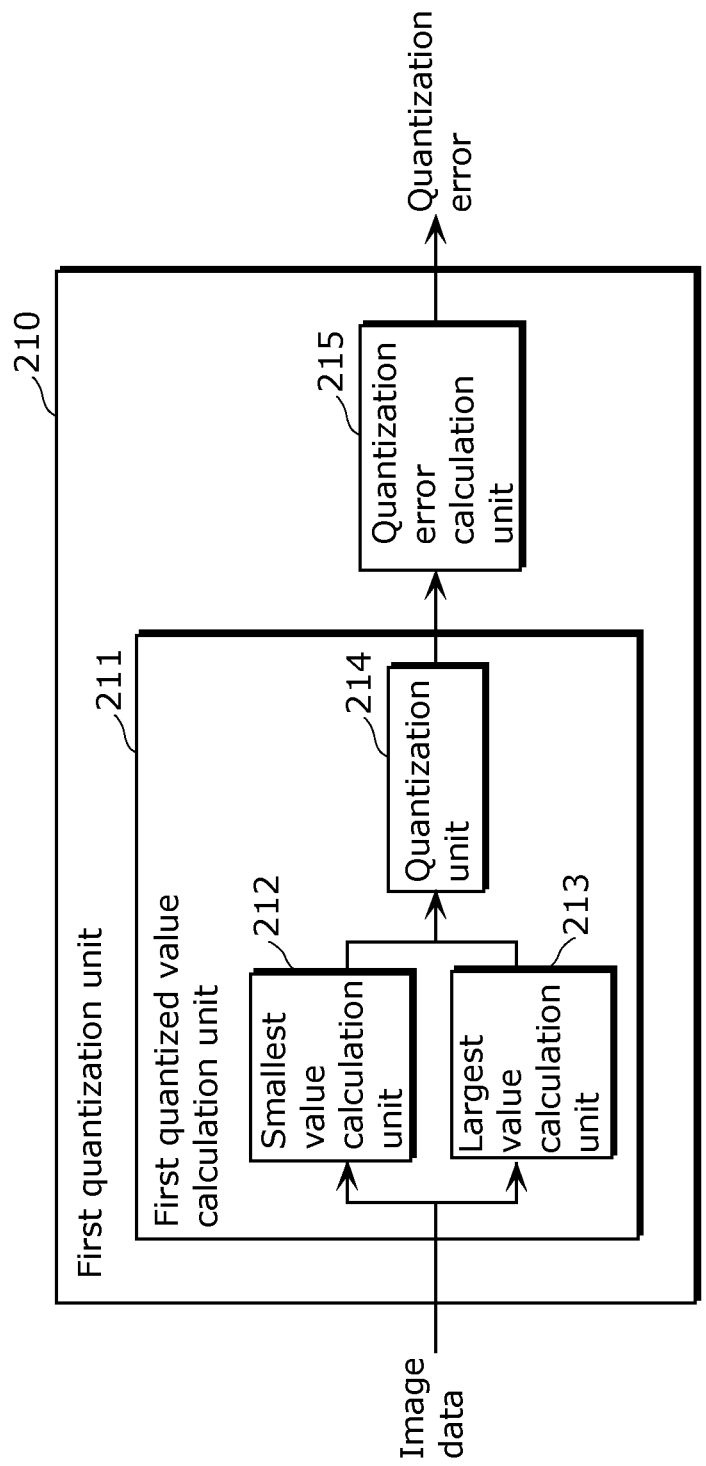
FIG. 3 shows a configuration of a first quantization unit according to an embodiment of the present invention.

FIG. 3 shows a configuration of the first quantization unit 210 according to the present embodiment of the present invention.

As shown in FIG. 3, the first quantization unit 210 is a processing unit which quantizes input image data in the quantization mode 1, and includes: a first quantized value calculation unit 211 which calculates quantized values in the quantization mode 1; and a quantization error calculation unit 215 which calculates a quantization error that has occurred in the quantization mode 1. The first quantized value calculation unit 211 includes a smallest value calculation unit 212, a largest value calculation unit 213, and a quantization unit 214.

The smallest value calculation unit 212 calculates A1 which is the smallest pixel value among pixel values of pixels included in an input image block.

The largest value calculation unit 213 calculates B1 which is the largest pixel value among the pixel values of the pixels included in the input image block.

Using the smallest value A1 calculated by the smallest value calculation unit 212 and the largest value B1 calculated by the largest value calculation unit 213, the quantization unit 214 quantizes each pixel value in a range from the A1 to the B1 inclusive, and outputs the quantized values.

The quantization error calculation unit 215 calculates quantization error from the original input image based on the quantized values obtained through the quantization by the quantization unit 214.

Next, the following describes in detail a configuration of the second quantization unit 220.

Figure 4:
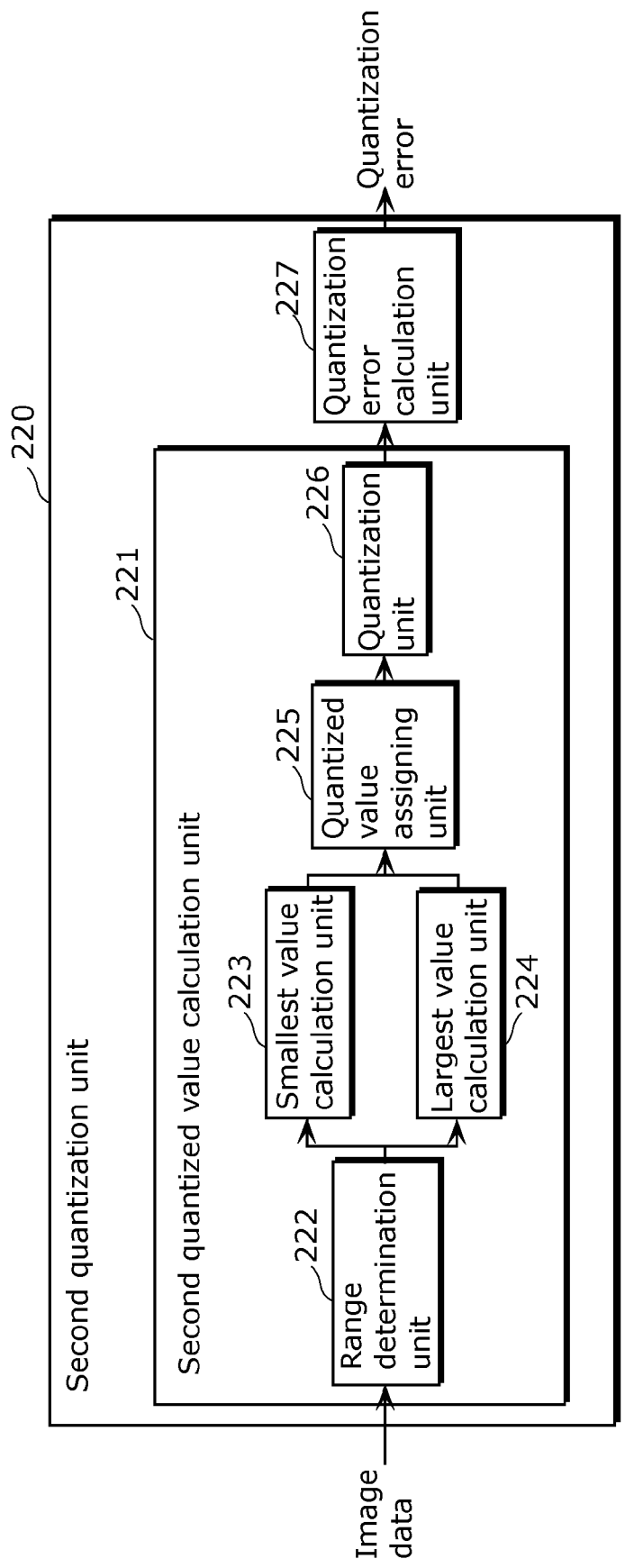
FIG. 4 shows a configuration of a second quantization unit according to an embodiment of the present invention.

FIG. 4 shows a configuration of the second quantization unit 220 according to the present embodiment of the present invention.

As shown in FIG. 4, the second quantization unit 220 is a processing unit which quantizes input image data in the quantization mode 2, and includes: a second quantized value calculation unit 221 which calculates quantized values in the quantization mode 2; and a quantization error calculation unit 227 which calculates a quantization error that has occurred in the quantization mode 2. The second quantized value calculation unit 221 includes a range determination unit 222, a smallest value calculation unit 223, a largest value calculation unit 224, a quantized value assigning unit 225, and a quantization unit 226.

The range determination unit 222 determines which of (i) a range no less than 0 and less than P and (ii) a range from the P to $2^n-1$ inclusive, each pixel value included in the input image data belongs to. Here, the P is a value from 0 to $2^n-1$ inclusive.

The smallest value calculation unit 223 calculates B2 which is the largest pixel value among pixel values in the range having smaller pixel values, i.e., in the range no less than 0 and less than the P.

The largest value calculation unit 224 calculates A2 which is the smallest pixel value among pixel values in the range having larger pixel values, i.e., in the range from the P to $2^n-1$ inclusive.

Using the smallest pixel value A2 and the largest pixel value B2 respectively calculated by the largest value calculation unit 224 and the smallest value calculation unit 223, the quantized value assigning unit 225 assigns quantized values to each of the two ranges in which the quantization is to be performed in the quantization mode 2. More specifically, the quantized value assigning unit 225 assigns the quantized values to the two ranges in proportion to the widths of the respective ranges.

The quantization unit 226 quantizes each of the pixel values in each range using the quantized values assigned, and outputs the resulting quantized values.

The quantization error calculation unit 227 calculates a quantization error from the original input image based on the quantized values obtained through the quantization by the quantization unit 226.

Next, the following describes in detail a configuration of the image expansion device 400.

Figure 5:
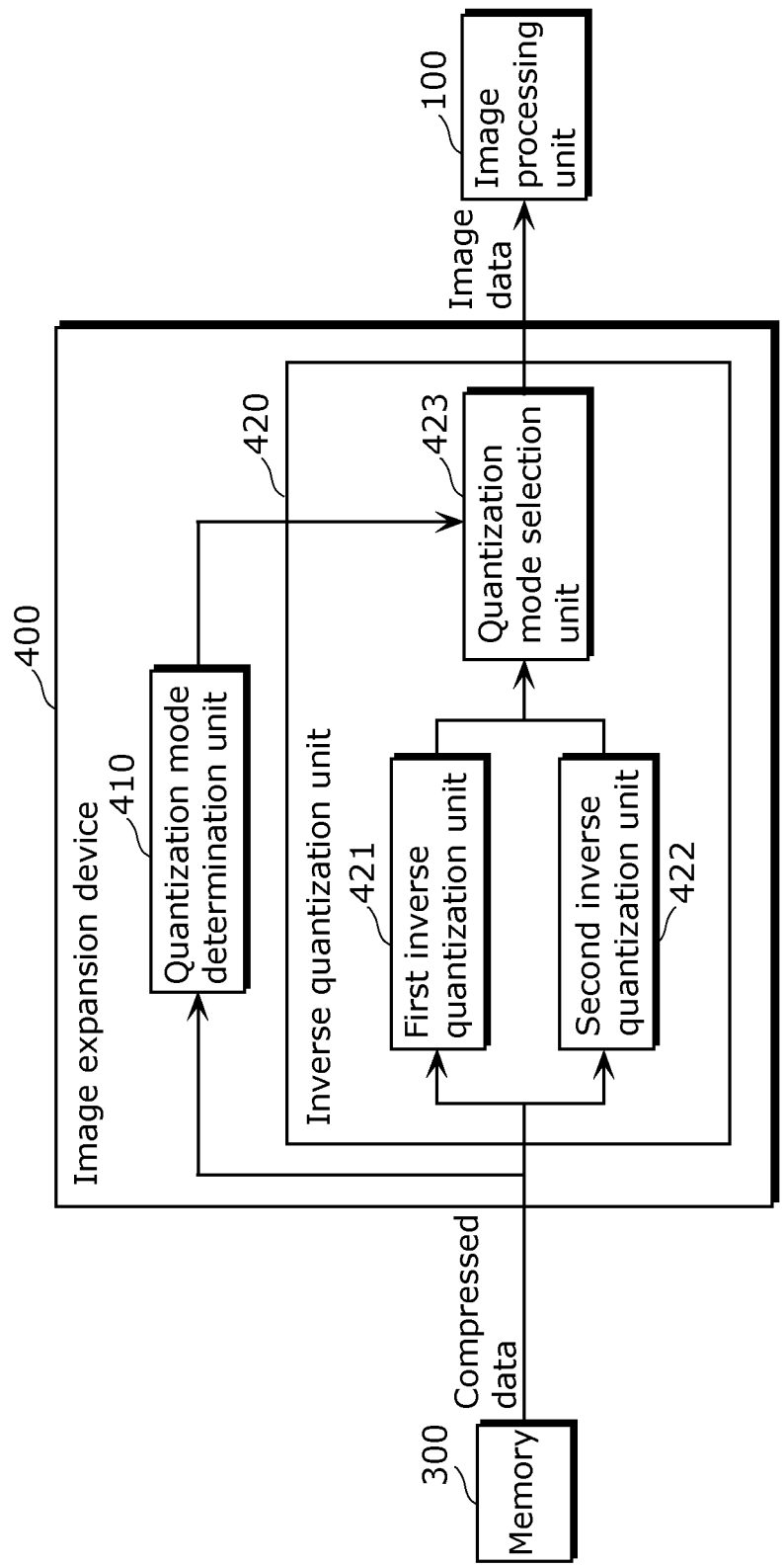
FIG. 5 shows a configuration of an image expansion device according to an embodiment of the present invention.

FIG. 5 shows a configuration of the image expansion device 400 according to the present embodiment of the present invention.

The image expansion device 400 is a device which expands compressed data that is image data compressed by the image compression device 200. The image expansion device 400 expands the compressed data input from the memory 300 and outputs the resulting image data to the image processing unit 100. As shown in FIG. 5, the image expansion device 400 includes a quantization mode determination unit 410 and an inverse quantization unit 420.

The quantization mode determination unit 410 determines, between the quantization mode 1 and the quantization mode 2, a quantization mode corresponding to quantized values included in the input compressed data, based on a magnitude relationship between the value A and the value B included in the compressed data. To put it differently, the quantization mode determination unit 410 compares the A and the B to determine whether the compressed data has been generated in the quantization mode 1 or the quantization mode 2.

The inverse quantization unit 420 performs inverse quantization on the quantized values to obtain pixel values, in the quantization mode determined by the quantization mode determination unit 410. Here, the inverse quantization unit 420 includes a first inverse quantization unit 421, a second inverse quantization unit 422, and a quantization mode selection unit 423.

The first inverse quantization unit 421 calculates each pixel value by performing inverse quantization on the quantized value, included in the compressed data, of each pixel, assuming that each pixel value has been quantized in the quantization mode 1.

The second inverse quantization unit 422 calculates each pixel value by performing inverse quantization on the quantized value, included in the compressed data, of each pixel, assuming that each pixel value has been quantized in the quantization mode 2.

The quantization mode selection unit 423 selects, according to the result of the determination by the quantization mode determination unit 410, either the result of the inverse quantization by the first inverse quantization unit 421 or the result of the inverse quantization by the second inverse quantization unit 422, and outputs the selected result to the image processing unit 100 as image data.

It is to be noted that the quantization mode selection unit 423 may cause, according to the result of the determination by the quantization mode determination unit 410, either the first inverse quantization unit 421 or the second inverse quantization unit 422 to perform the inverse quantization, and the first inverse quantization unit 421 or the second inverse quantization unit 422 which has performed the inverse quantization may output the result of the inverse quantization to the image processing unit 100 as image data.

Next, the following describes in detail the image data compression performed by the image compression device 200.

Figure 6:
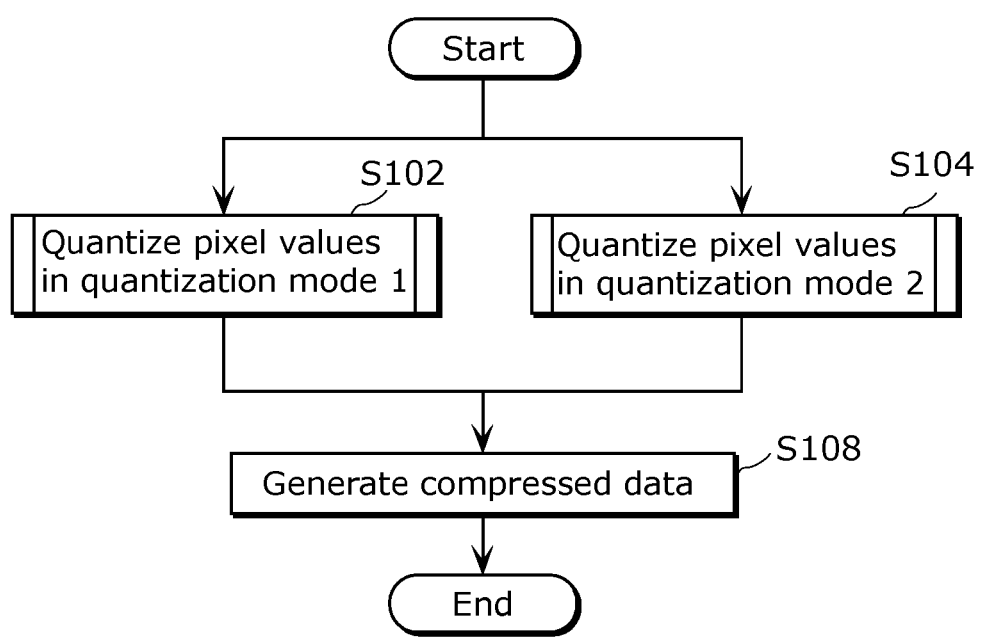
FIG. 6 is a flowchart showing an example of image data compression performed by an image compression device according to an embodiment of the present invention.

FIG. 6 is a flowchart showing an example of the image data compression performed by the image compression device 200 according to the present embodiment of the present invention.

Here, it is assumed that the bit width of input pixel values is n, and each pixel value is to be quantized to an m-bit value. For simplicity, the input image is assumed to be a grey-scale image having one channel, but an image having a plurality of channels, such as three channels of RGB or four channels of ARGB, can be easily processed in the same manner through application of the present embodiment to each channel.

As shown in FIG. 6, as a first quantization step, the first quantization unit 210 performs the quantization mode 1 to quantize pixel values using two values A1 and B1 where A1<B1, in one range defined by the A1 and the B1, and calculates a quantization error (S102). More specifically, the first quantization unit 210 performs the quantization mode 1 to quantize a plurality of pixel values using the two values A1 and B1 where A1<B1, in a range from the A1 to the B1 inclusive. It is to be noted that the quantization of the pixel values in the quantization mode 1 performed by the first quantization unit 210 will be described in detail later.

Furthermore, as a second quantization step, the second quantization unit 220 performs the quantization mode 2 to quantize the pixel values using two values A2 and B2 where A2>B2, in two ranges defined by the A2 and the B2, and calculates a quantization error (S104). More specifically, the second quantization unit 220 performs the quantization mode 2 to quantize the plurality of pixel values using the two values A2 and B2 where A2>B2, in two ranges that are (i) a range from 0 to B2 inclusive and (ii) a range from A2 to $2^n-1$ inclusive. It is to be noted that the quantization of the pixel values in the quantization mode 2 performed by the second quantization unit 220 will be described in detail later.

It is to be noted that the quantization in the quantization mode 1 (S102) and the quantization in the quantization mode 2 (S104) do not have to be performed in parallel, and one may be performed earlier than the other so that the two quantization processing are performed in turn. In particular, in the case where the first quantization unit 210 and the second quantization unit 220 are implemented by software, the two quantization processing can be achieved by performing them in turn.

Subsequently, as a compressed data generation step, the compressed data generation unit 240 generates compressed data including a value A, a value B, and quantized values of the pixel values quantized in a selected quantization mode (S108).

More specifically, after the quantization is performed in the quantization mode 1 and the quantization mode 2, the quantization mode selection unit 230 selects a quantization mode with a smaller quantization error. Here, it is unnecessary to newly add an information bit for identifying the quantization modes, because each quantization mode is distinguishable according to the magnitudes of the values A and B.

Then, the compressed data generation unit 240 generates the compressed data including the value A, the value B, and the quantized values of the pixel values quantized in the selected quantization mode, using: the A1 as the A and the B1 as the B when the quantization mode 1 is selected; and the A2 as the A and the B2 as the B when the quantization mode 2 is selected. Then, the compressed data generation unit 240 outputs the compressed data to the memory 300.

With the above processing, the image data compression by the image compression device 200 is finished.

Next, the following describes in detail the quantization of the pixel values in the quantization mode 1 performed by the first quantization unit 210 (S102 in FIG. 6).

Figure 7:
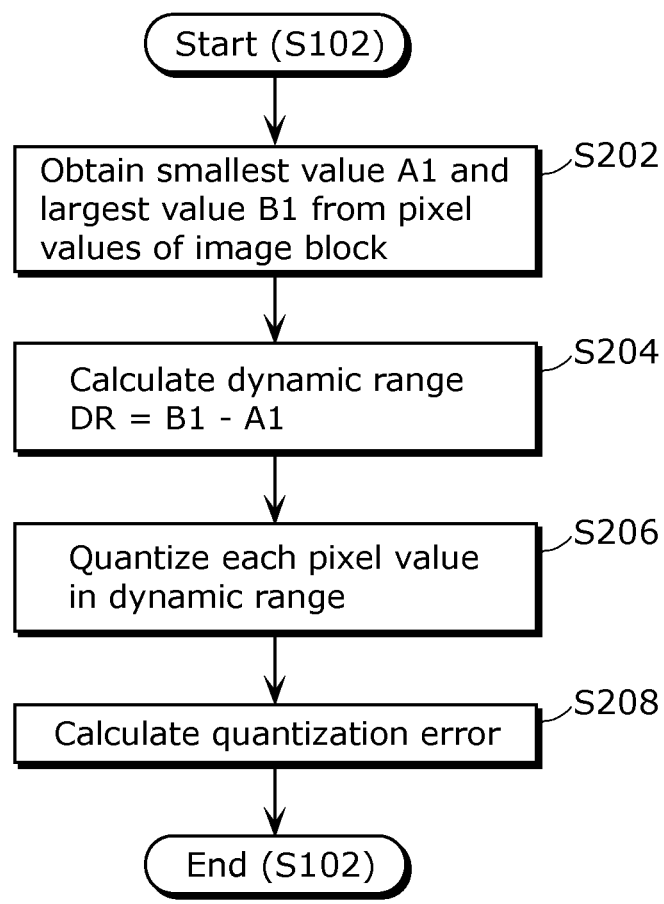
FIG. 7 is a flowchart showing an example of quantization of pixel values in a quantization mode 1 performed by a first quantization unit according to an embodiment of the present invention.

FIG. 7 is a flowchart showing an example of the quantization of the pixel values in the quantization mode 1 performed by the first quantization unit 210 according to the present embodiment of the present invention.

As shown in FIG. 7, first, the first quantization unit 210 obtains the value A1 and the value B1 from the pixel values in an image block (S202).

Figure 8:
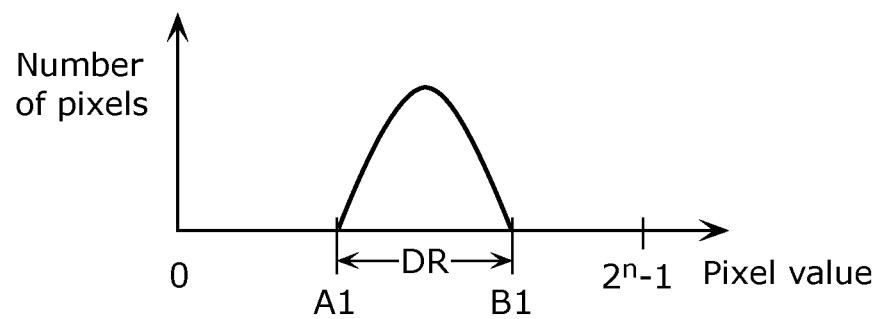
FIG. 8 is a diagram for describing obtainment of a value A1 and a value B1 from pixel values in an image block, performed by a first quantization unit according to an embodiment of the present invention.

FIG. 8 is a diagram for describing the obtainment of the value A1 and the value B1 from pixel values in an image block, performed by the first quantization unit 210 according to the present embodiment of the present invention.

As shown in FIG. 8, the smallest value calculation unit 212 included in the first quantized value calculation unit 211 of the first quantization unit 210 obtains, by calculation, the smallest value A1 among the pixel values of a plurality of pixels included in an input image block. Furthermore, the largest value calculation unit 213 obtains, by calculation, the largest value B1 among the pixel values. Here, the smallest value A1 and the largest value B1 are two values satisfying $0 \leq A1 \leq B1 \leq 2^n-1$.

Returning to FIG. 7, next, the quantization unit 214 calculates a dynamic range DR=B1−A1, using the smallest value A1 and the largest value B1 respectively calculated by the smallest value calculation unit 212 and the largest value calculation unit 213 (S204). More specifically, the quantization unit 214 calculates the width DR of the range shown in FIG. 8.

The quantization unit 214 then quantizes each pixel value in the range from the A1 to the B1 inclusive, i.e., in the dynamic range, and outputs the quantized values (S206).

Figure 9:
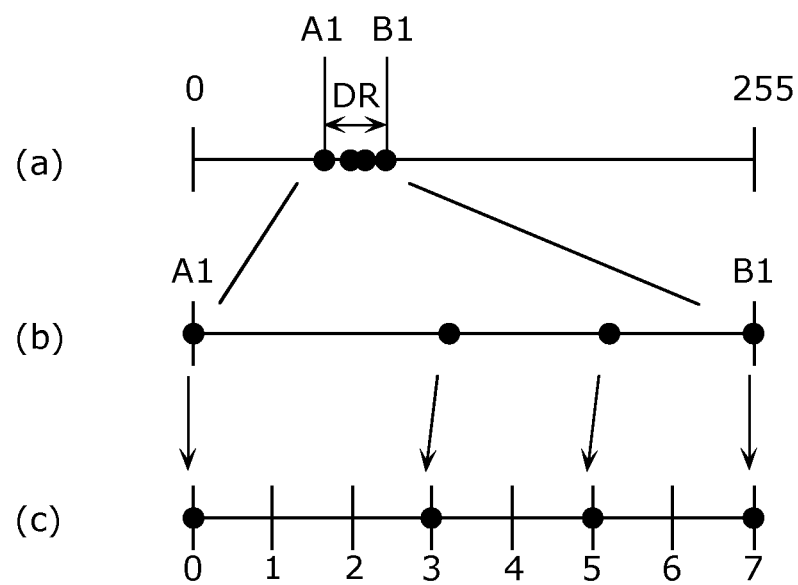
FIG. 9 is a diagram for describing quantization in a range from A1 to B1 inclusive, performed by a quantization unit according to an embodiment of the present invention.

FIG. 9 is a diagram for describing the quantization in the range from the A1 to the B1 inclusive, performed by the quantization unit 214 according to the present embodiment of the present invention.

As shown in (a) and (b) of FIG. 9, the quantization unit 214 extracts, from the pixel values 0 through 255 (when n=8), the dynamic range DR from the A1 to the B1 inclusive, which is a range of pixel values indicated by current pixels. Then, as shown in (b) and (c) of FIG. 9, the quantization unit 214 performs the quantization in the dynamic range DR (quantization of the pixel values to 3-bit values in FIG. 9). This enables reduction in the quantization error.

Returning to FIG. 7, the quantization error calculation unit 215 calculates quantization error from the original input image based on the quantized values obtained through the quantization by the quantization unit 214 (S208).

With the above processing, the quantization of the pixel values in the quantization mode 1 performed by the first quantization unit 210 (S102 in FIG. 6) is finished.

Next, the following describes in detail the quantization of the pixel values in the quantization mode 2 performed by the second quantization unit 220 (S104 in FIG. 6).

Figure 10:
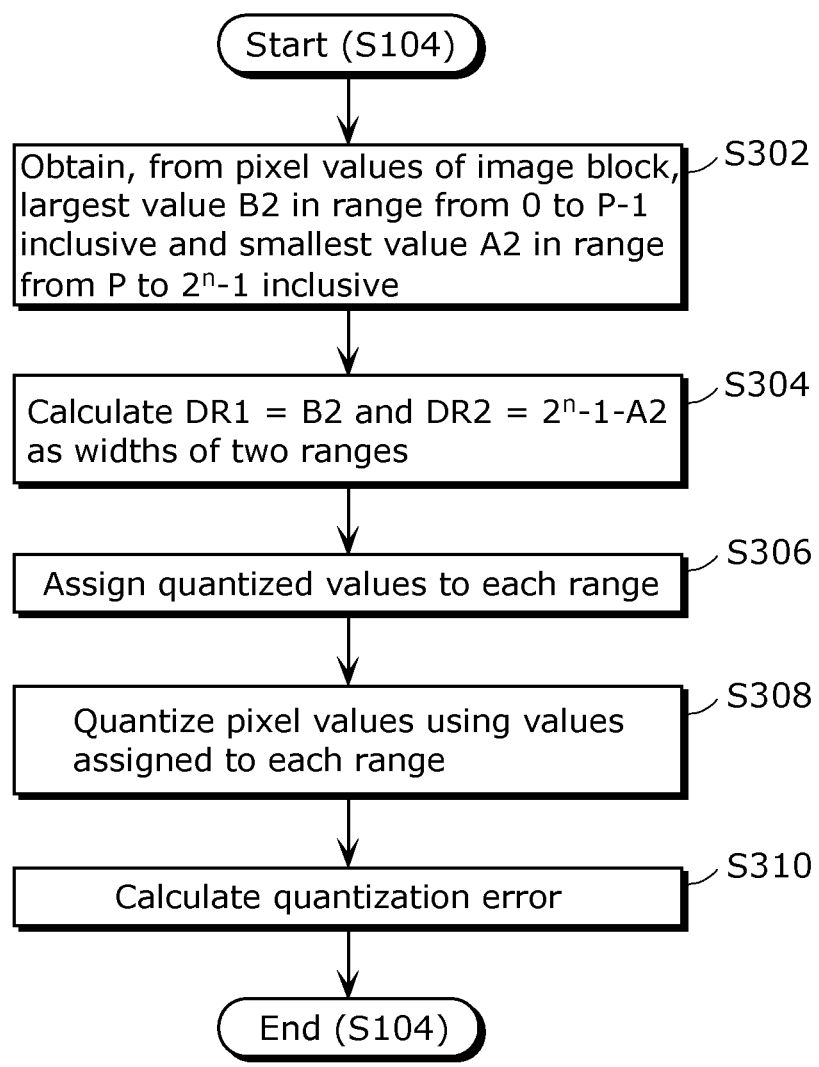
FIG. 10 is a flowchart showing an example of quantization of pixel values in a quantization mode 2 performed by a second quantization unit according to an embodiment of the present invention.

FIG. 10 is a flowchart showing an example of the quantization of the pixel values in the quantization mode 2 performed by the second quantization unit 220 according to the present embodiment of the present invention.

As shown in FIG. 10, the second quantization unit 220 first obtains the two values A2 and B2 from pixel values in an image block (S302).

Figure 11:
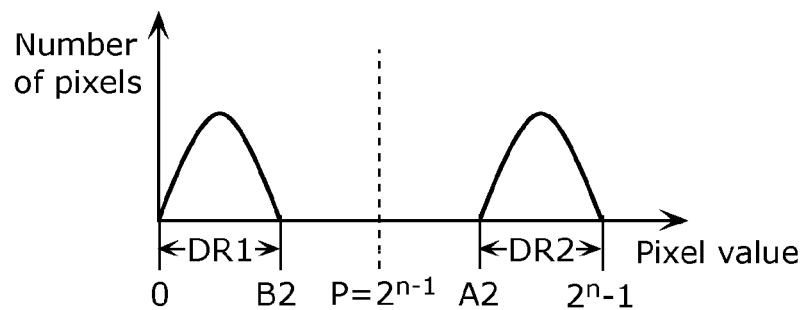
FIG. 11 is a diagram for describing obtainment of a value A2 and a value B2 from pixel values in an image block, performed by a second quantization unit according to an embodiment of the present invention.

FIG. 11 is a diagram for describing the obtainment of the value A2 and the value B2 from the pixel values in an image block, performed by the second quantization unit 220 according to the present embodiment of the present invention.

As shown in FIG. 11, these two values are determined so that they satisfy $0 \leq B2 < A2 \leq 2^n-1$. More specifically, the range determination unit 222 included in the second quantized value calculation unit 221 of the second quantization unit 220 determines which of (i) a range no less than 0 and less than P and (ii) a range from the P to $2^n-1$ inclusive, each of the pixel values included in the input image data belongs to. Here, the P is a value from 0 to $2^n-1$ inclusive.

Then, the smallest value calculation unit 223 calculates the B2 which is the largest pixel value among pixel values in the range having smaller pixel values, i.e., in the range no less than 0 and less than the P.

Furthermore, the largest value calculation unit 224 calculates the A2 which is the smallest pixel value among pixel values in the range having larger pixel values, i.e., in the range from the P to $2^n-1$ inclusive. As shown in FIG. 11, it is generally preferable for the value P to be an intermediate value such as $2^{n-1}$.

Returning to FIG. 10, next, the quantized value assigning unit 225 calculates the widths DR1 and DR2 of the two ranges using the value A and the value B respectively calculated by the largest value calculation unit 224 and the smallest value calculation unit 223 (S304). More specifically, the quantized value assigning unit 225 calculates DR1=B2 and DR2=$2^n$-1-A2 as the respective range widths.

Figure 12:
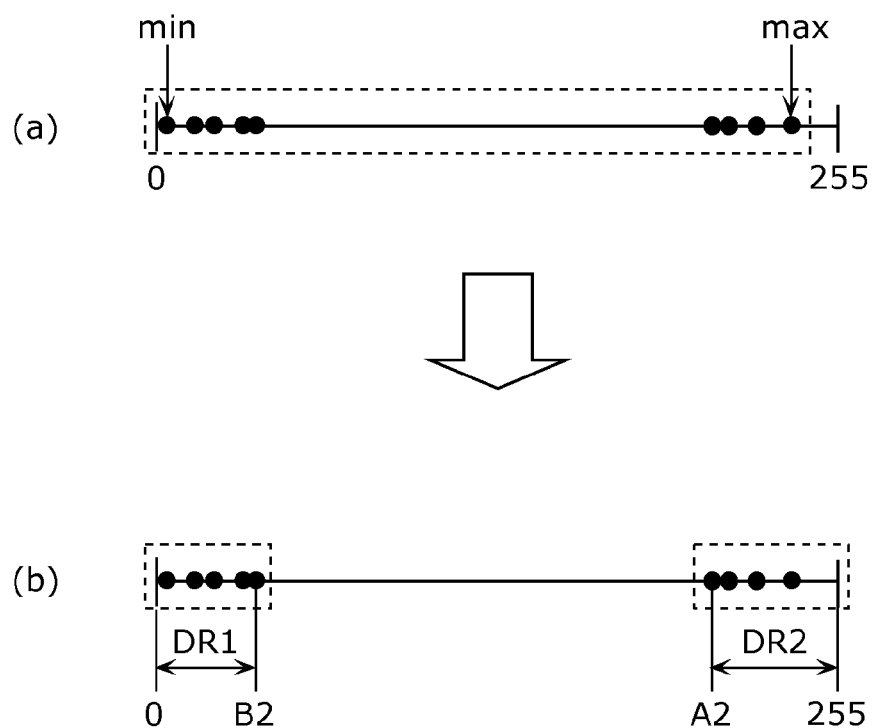
FIG. 12 is a diagram for describing quantization performed in two ranges by a second quantization unit according to an embodiment of the present invention.

FIG. 12 is a diagram for describing the quantization performed in the two ranges by the second quantization unit 220 according to the present embodiment of the present invention.

As shown in (a) and (b) of FIG. 12, the second quantization unit 220 extracts, from the pixel values 0 through 255 (when n=8), the range DR1 from 0 to B2 inclusive and the range DR2 from the A2 to 255 inclusive that are ranges of the pixel values indicated by current pixels. Then, the second quantization unit 220 quantizes the pixel values in the ranges DR1 and DR2. This enables reduction in the quantization error.

That is to say, the quantization in the quantization mode 1 is effective when the pixel value distribution is small and the dynamic range DR is thus small as shown in FIG. 9.

On the other hand, the quantization in the quantization mode 2 is effective when there are two separate ranges of pixel value distribution, each distribution is small, and the dynamic ranges DR1 and DR2 are thus small as shown in FIG. 12. Here, with the above quantization method, it is guaranteed that $A1 \leq B1$ is satisfied in the quantization mode 1 and $A2 > B2$ is satisfied in the quantization mode 2.

Returning to FIG. 10, the quantized value assigning unit 225 then assigns quantized values to each of the two ranges in which the quantization mode 2 is to be performed (S306).

Figure 13:
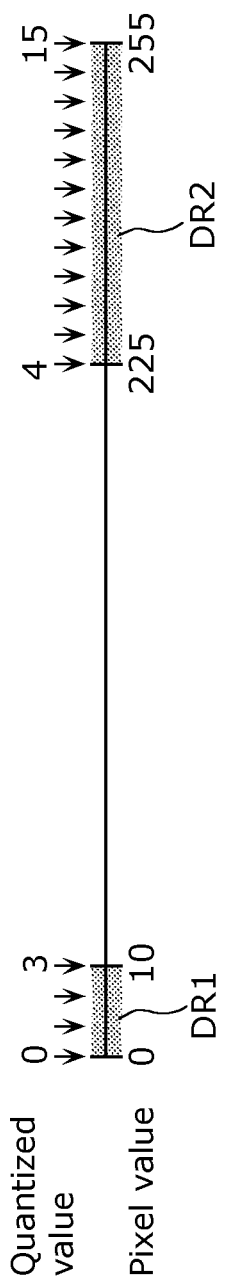
FIG. 13 is a diagram for describing assignment of quantized values to two ranges, performed by a quantized value assigning unit according to an embodiment of the present invention.

FIG. 13 is a diagram for describing the assignment of the quantized values to the two ranges, performed by the quantized value assigning unit 225 according to the present embodiment of the present invention.

The quantized value assigning unit 225 assigns $2^m$ quantized values to the two ranges using the DR1 and the DR2. For example, as shown in FIG. 13, the quantized value assigning unit 225 assigns 16 values of 0 through 15, which are 4-bit (m=4) quantized values, to pixel values in the range from 0 to 255 inclusive, which are 8-bit (n=8) pixel values.

More specifically, the quantized value assigning unit 225 assigns, to the ranges DR1 and DR2, a given number of quantized values among $2^m$ quantized values in proportion to the respective sizes of the DR1 and the DR2. In FIG. 13, four quantized values of 0 through 3 are assigned to the range DR1 having the pixel values 0 through 10, while 12 quantized values of 4 through 15 are assigned to the range DR2 having the pixel values 225 through 255.

It is to be noted that when the number of quantized values assigned to the DR1 is N1 and the number of quantized values assigned to the DR2 is N2, N1+N2=$2^m$ is established.

Returning to FIG. 10, the quantization unit 226 quantizes each pixel value in each range using the quantized values assigned to each range, and outputs the quantized values (S308).

Then, the quantization error calculation unit 227 calculates a quantization error of the entire image block based on the quantized values obtained through the quantization by the quantization unit 226 (S310).

With the above processing, the quantization of the pixel values in the quantization mode 2 performed by the second quantization unit 220 (S104 in FIG. 6) is finished.

Next, the following describes the expansion, performed by the image expansion device 400, of compressed data which is image data compressed by the image compression.

Figure 14:
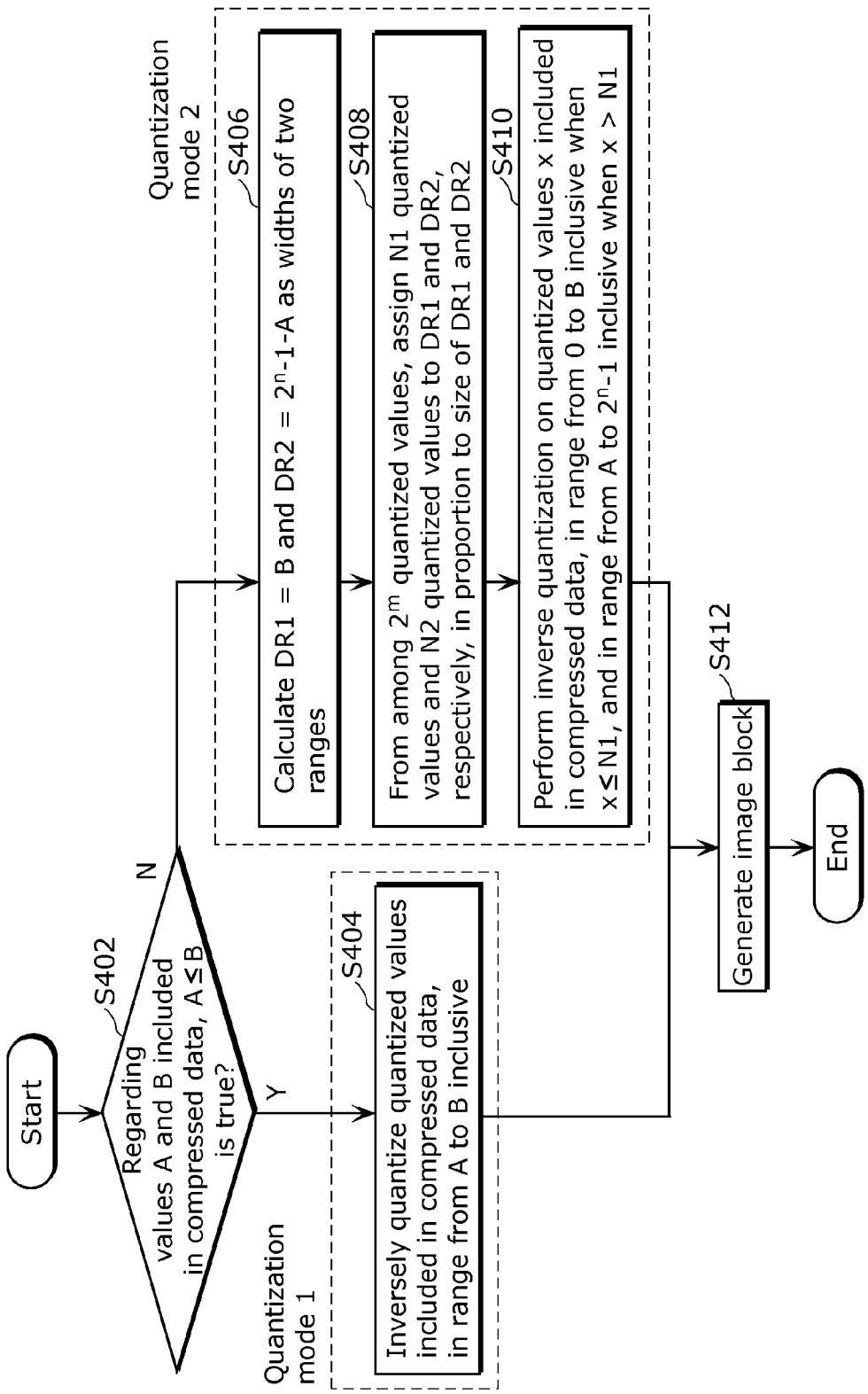
FIG. 14 is a flowchart showing an example of compressed data expansion performed by an image expansion device according to an embodiment of the present invention.

FIG. 14 is a flowchart showing an example of the compressed data expansion performed by the image expansion device 400 according to the present embodiment of the present invention. More specifically, FIG. 14 shows generation of an image block including a plurality of pixel values, from the compressed data which includes the value A, the value B, and the quantized values corresponding to the pixel values which have been quantized to the m-bit values. Although the following only describes the case of a one-channel image as in the compression processing, the approach used for the one-channel image can be applied to an image having a plurality of channels.

As shown in FIG. 14, the quantization mode determination unit 410 determines whether or not $A \leq B$ is true by comparing the value A and the value B included in the compressed data (S402).

The quantization mode determination unit 410 determines that (i) inverse quantization is to be performed in the quantization mode 1 when determining that $A \leq B$ is true (Y in S402) and (ii) inverse quantization is to be performed in the quantization mode 2 when determining that A>B is true (N in S402).

More specifically, as for the inverse quantization in the quantization mode 1, the first inverse quantization unit 421 performs the inverse quantization on the quantized values included in the compressed data, in the range from the A to the B inclusive, assuming that the pixel values have been quantized in the quantization mode 1 (S404).

As for the inverse quantization in the quantization mode 2, the second inverse quantization unit 422 performs inverse quantization on the quantized values included in the compressed data, assuming that the pixel values have been quantized in the quantization mode 2.

More specifically, with the same processing as that in the compression (S304 and S306 in FIG. 10), the second inverse quantization unit 422 first calculates DR1=B and DR2=$2^n$−1−A as the widths of two ranges, i.e., a range from 0 to the B inclusive and a range from the A to $2^n$−1 inclusive (S406). The second inverse quantization unit 422 then assigns, from among $2^m$ quantized values, N1 quantized values and N2 quantized values to the two ranges in proportion to the respective sizes of the DR1 and the DR2 (S408).

Then, using the N1, the second inverse quantization unit 422 performs the inverse quantization on a quantized value x included in the compressed data, (i) in the range from 0 to the B inclusive when x≤N1 is satisfied, and (ii) in the range from the A to $2^n$−1 inclusive when x>N1 is satisfied (S410).

Next, the quantization mode selection unit 423 generates an image block using the pixel values obtained through the inverse quantization performed by either the first inverse quantization unit 421 or the second inverse quantization unit 422 according to the result of the determination by the quantization mode determination unit 410 (S412). With this, the quantization mode selection unit 423 outputs the image data including a plurality of image blocks to the image processing unit 100.

As described thus far, the image compression device 200 according to the present embodiment of the present invention has a function to perform (i) the quantization mode 1 to quantize a plurality of pixel values in one range and (ii) the quantization mode 2 to group a plurality of pixel values into two ranges and quantize the pixel values in the two ranges. Then, the image compression device 200 generates the compressed data including the value A, the value B, and the quantized values, using: the A1 as the A and the B1 as the B where A1≤B1, when the quantization mode 1 is selected; and the A2 as the A and the B2 as the B where A2>B2, when the quantization mode 2 is selected. That is to say, it is possible to identify the selected quantization mode using the two conventionally necessary values of the A and the B, because A≤B indicates that the quantization mode 1 has been selected, whereas A>B indicates that the quantization mode 2 has been selected. This makes it possible to use the quantization mode 2 for the quantization in two ranges in addition to the quantization mode 1 equivalent to the conventional technique, without having to add information for distinguishing between the two quantization modes to the compressed data. It is thus possible to perform the image compression in an appropriate quantization mode selected from these two. Moreover, in the case of image data having a wide dynamic range yet having pixel values concentrated in two ranges, the quantization in the quantization mode 2 narrows the width of each range, thereby enabling reduction in the quantization error. As a result, even when the dynamic range is wide, it is possible to reduce the quantization error while preventing a decrease in the compression rate caused by an increased amount of data.

The one range defined by the first quantization unit 210 is a range from the A1 to the B1 inclusive. That is to say, the image compression device 200 includes the first quantization unit 210 which quantizes a plurality of pixel values in the range from the A1 to the B1 inclusive when the pixel values are concentrated in that one range. This enables the image compression device 200 to perform the image compression using the two values of the A1 and the B1 when the pixel values are concentrated in that one range.

The two ranges defined by the second quantization unit 220 are a range from 0 to the B2 inclusive and a range from the A2 to $2^n$−1 inclusive. That is to say, the image compression device 200 includes the second quantization unit 220 which quantizes a plurality of pixel values in the two ranges that are (i) the range from 0 to the B2 inclusive and (ii) the range from the A2 to $2^n$−1 inclusive, when the pixel values are concentrated in these two ranges. This enables the image compression device 200 to perform the image compression using the two values of the A2 and the B2 when the pixel values are concentrated in these two ranges.

Furthermore, the image compression device 200 selects, between the quantization mode 1 and the quantization mode 2, a quantization mode to be used in the quantization, and generates the compressed data according to the selected quantization mode. Thus, the image compression device 200 can select an appropriate quantization mode and perform optimal image compression according to the selected quantization mode.

Moreover, the image compression device 200 calculates the quantization error that has occurred in the quantization mode 1 and the quantization mode 2, and selects a quantization mode with a smaller quantization error. With this, even when the dynamic range is wide, it is possible to reduce the quantization error while preventing a decrease in the compression rate caused by an increased amount of data.

Furthermore, the image compression device 200 performs (i) the quantization mode 1 using, as the A1 and the B1, the smallest value and the largest value among the pixel values, respectively, and (ii) the quantization mode 2 using, as the B2, the largest value among the pixel values in one of two ranges into which smaller pixel values are grouped, and using, as the A2, the smallest value among the pixel values in the other range into which larger pixel values are grouped. This allows each quantization mode to be performed with easy obtainment of the A1, the B1, the A2, and the B2.

Moreover, in the quantization mode 2, the image compression device 200 assigns the quantized values to the two ranges and performs the quantization in each range. For example, the image compression device 200 assigns the same quantized values as those in the quantization mode 1 to the two ranges. By doing so, even in the quantization mode 2 in which the range is divided into two, it is possible to perform the quantization using the same quantized values as those in the quantization mode 1 in which the number of ranges is one.

Moreover, in the quantization mode 2, the image compression device 200 assigns the quantized values to the two ranges in proportion to the respective range widths, and performs the quantization in each range. That is to say, the larger the range width, the larger the distribution of the pixel values, and thus the larger the number of quantized values assigned. This equalizes the values of the quantization error between the two ranges, thereby enabling reduction in the quantization error.

Furthermore, for each image block, the image compression device 200 performs the quantization mode 1 or the quantization mode 2 and generates the compressed data. That is to say, when the amount of data in the image data is large, the image compression device 200 divides the image data into a plurality of image blocks, and performs the image compression for each image block. This enables the image compression device 200 to perform the image compression on the entire image data even when the amount of data in the image data is large.

Moreover, the image expansion device 400 according to the present embodiment of the present invention determines a quantization mode based on a magnitude relationship between the values A and B included in the compressed data, and performs the inverse quantization corresponding to the determined quantization mode. For example, the image expansion device 400 determines the quantization mode 1 when A≤B is true and determines the quantization mode 2 when A>B is true, and performs the inverse quantization accordingly. With this, referring to the values A and B allows the image expansion device 400 to expand the compressed data generated through the compression by the image compression device 200, to generate the original image data that is the compressed data before compression.

Furthermore, the image processing apparatus 10 according to the present embodiment of the present invention includes: the image compression device 200 which generates compressed data and writes the compressed data in the memory 300; the image expansion device 400 which reads the compressed data from the memory 300 and expands the compressed data to generate image data; and an image processing unit 100 which transmits image data to the image compression device 200 and receives image data from the image expansion device 400. This enables implementation of the image processing apparatus 10 which compresses image data to generate compressed data having a small quantization error while preventing a decrease in the compression rate, and restores the compressed data to the image data.

(Variation 1 of Embodiment)

Next, the following describes Variation 1 of the above embodiment of the present invention. In the above embodiment, the image compression device 200 calculates the quantization error that has occurred in the quantization mode 1 and the quantization mode 2, and selects a quantization mode with a smaller quantization error. In the present Variation 1, however, the image compression device 200 calculates a range width in the quantization mode 1 and a range width in the quantization mode 2, and selects a quantization mode corresponding to a smaller range width.

More specifically, the first quantization unit 210 calculates a first range width by subtracting the A1 from the B1. Here, the first range width is a range width in the quantization mode 1.

The second quantization unit 220 calculates a second range width by adding the value of B2 and a value obtained by subtracting the A2 from $2^n-1$. Here, the second range width is a range width in the quantization mode 2.

The quantization mode selection unit 230 selects, as a quantization mode to be used in the quantization, a quantization mode corresponding to a smaller one of the first range width and the second range width.

It is to be noted that the functions of the other processing units included in the image compression device 200 according to the present Variation 1 are the same as the functions of the other processing units included in the image compression device 200 according to the above embodiment, and thus a detailed description thereof will be omitted.

Figure 15:
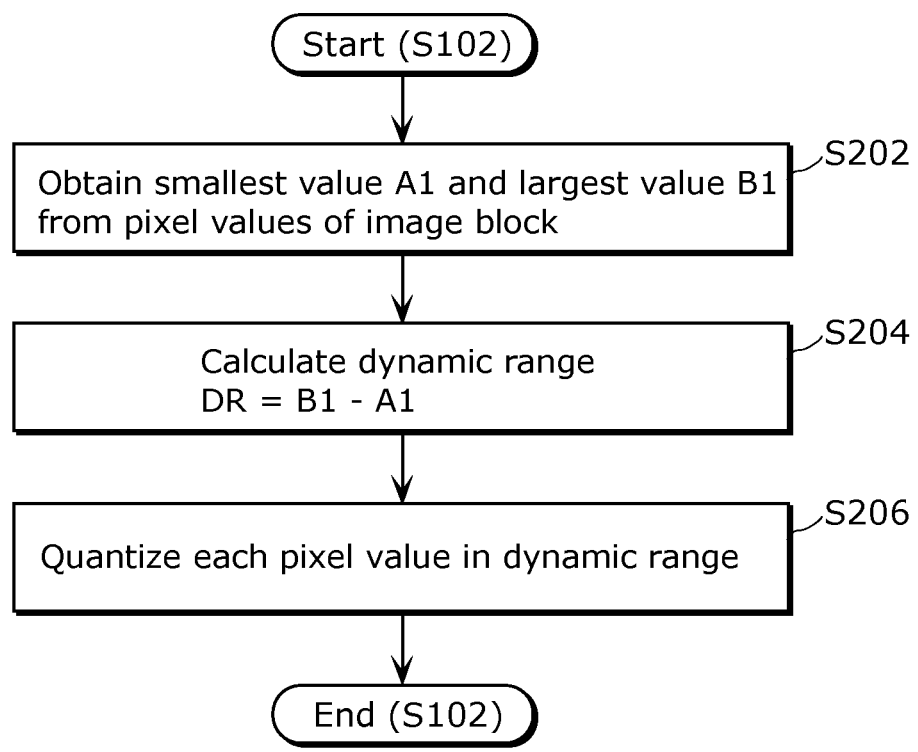
FIG. 15 is a flowchart showing an example of quantization of pixel values in a quantization mode 1 performed by a first quantization unit according to Variation 1 of an embodiment of the present invention.

FIG. 15 is a flowchart showing an example of quantization of pixel values in the quantization mode 1 performed by the first quantization unit 210 according to Variation 1 of the above embodiment of the present invention.

As shown in FIG. 15, the first quantization unit 210 obtains the smallest value A1 and the largest value B1 (S202), calculates the dynamic range DR=B1−A1 using the smallest value A1 and the largest value B1 (S204), and performs the quantization in the dynamic range (S206), as in the above embodiment. Here, the first quantization unit 210 uses the DR as the first range width.

Here, the first quantization unit 210 does not calculate the quantization error like the quantization error calculation unit 215 in the above embodiment (S208 in FIG. 7). The first quantization unit 210 does not have to include the quantization error calculation unit 215.

Figure 16:
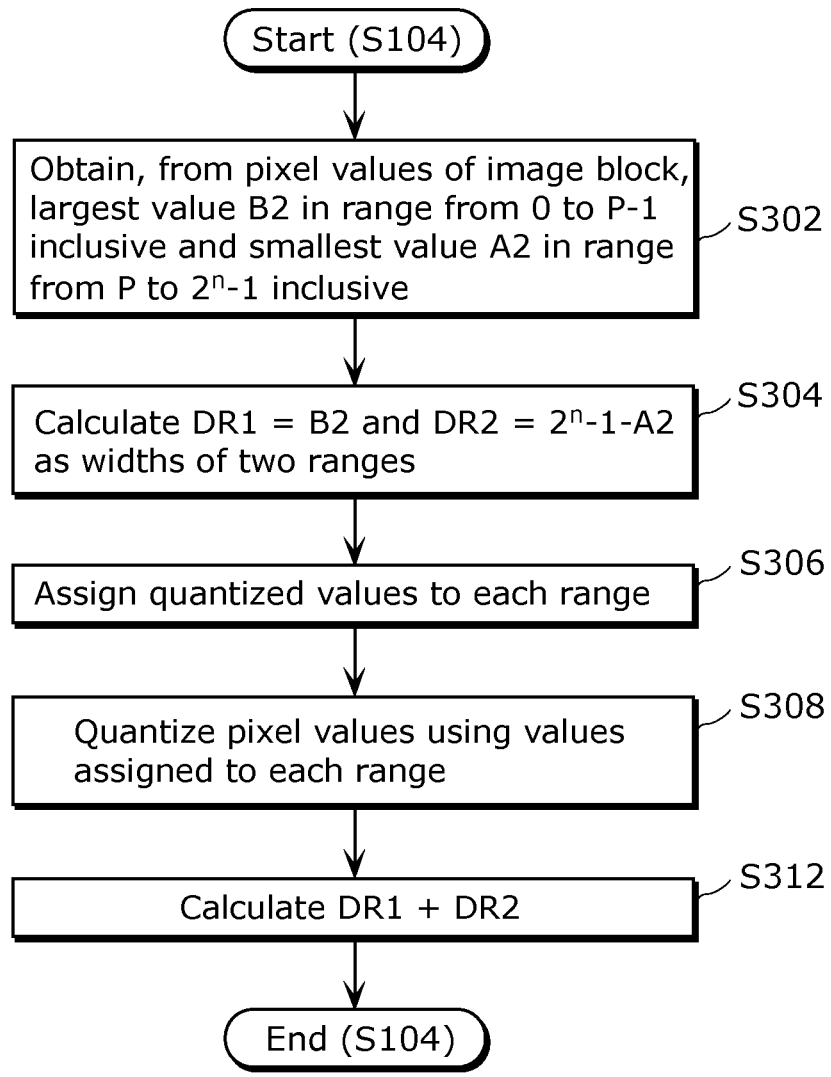
FIG. 16 is a flowchart showing an example of quantization of pixel values in a quantization mode 2 performed by a second quantization unit according to Variation 1 of an embodiment of the present invention.

FIG. 16 is a flowchart showing an example of quantization of pixel values in the quantization mode 2 performed by the second quantization unit 220 according to Variation 1 of the above embodiment of the present invention.

As shown in FIG. 16, the second quantization unit 220 obtains the smallest value A2 and the largest value B2 (S302), calculates the DR1 and the DR2 (S304), assigns the quantized values to each range (S306), and performs the quantization in each range (S308), as in the above embodiment.

Then, the second quantization unit 220 calculates a sum of the DR1 and the DR2 as the second range width (S310). That is to say, the second quantization unit 220 does not calculate the quantization error like the quantization error calculation unit 227 in the above embodiment (S310 in FIG. 10), but calculates the second range width. The second quantization unit 220 does not have to include the quantization error calculation unit 227.

With the above processing performed, the quantization mode selection unit 230 selects, as a quantization mode to be used in the quantization, a quantization mode corresponding to a smaller one of the first range width and the second range width.

As described above, the image compression device 200 according to Variation 1 of the above embodiment of the present invention calculates the range width in the quantization mode 1 and the range width in the quantization mode 2, and selects the quantization mode corresponding to a smaller range width. Here, the smaller range width means that the pixel values are concentrated in that range. Thus, the quantization in the quantization mode corresponding to the smaller range width enables reduction in the quantization error to a greater extent. Accordingly, even when the dynamic range is wide, it is possible to reduce the quantization error while preventing a decrease in the compression rate caused by an increased amount of data.

(Variation 2 of Embodiment)

Next, the following describes Variation 2 of the above embodiment of the present invention. In the above embodiment, in the quantization mode 2, the image compression device 200 obtains the A2 and the B2 with respect to predetermined P to perform the quantization. In the present Variation 2, however, the image compression device 200 obtains a plurality of A2 and a plurality of B2 with respect to a plurality of P, to select optimal A2 and B2.

More specifically, the second quantization unit 220 calculates the quantization error or the range width in the quantization mode 2 for a plurality of pairs of the A2 and the B2.

The quantization mode selection unit 230 selects, as a quantization mode to be used for the quantization, a quantization mode which makes the quantization error or the range width smallest, based on a result of the calculation by the first quantization unit 210 and a plurality of results of the calculation performed by the second quantization unit 220 for the pairs of the A2 and the B2.

When the quantization mode 2 is selected, the compressed data generation unit 240 generates the compressed data including the value A, the value B, and the quantized values of the pixel values quantized in the quantization mode 2, using, as the A and the B, the A2 and the B2 which make the quantization error or the range width smallest.

It is to be noted that the functions of the other processing units included in the image compression device 200 according to the present Variation 2 are the same as the functions of the other processing units included in the image compression device 200 according to the above embodiment, and thus a detailed description thereof will be omitted.

Figure 17:
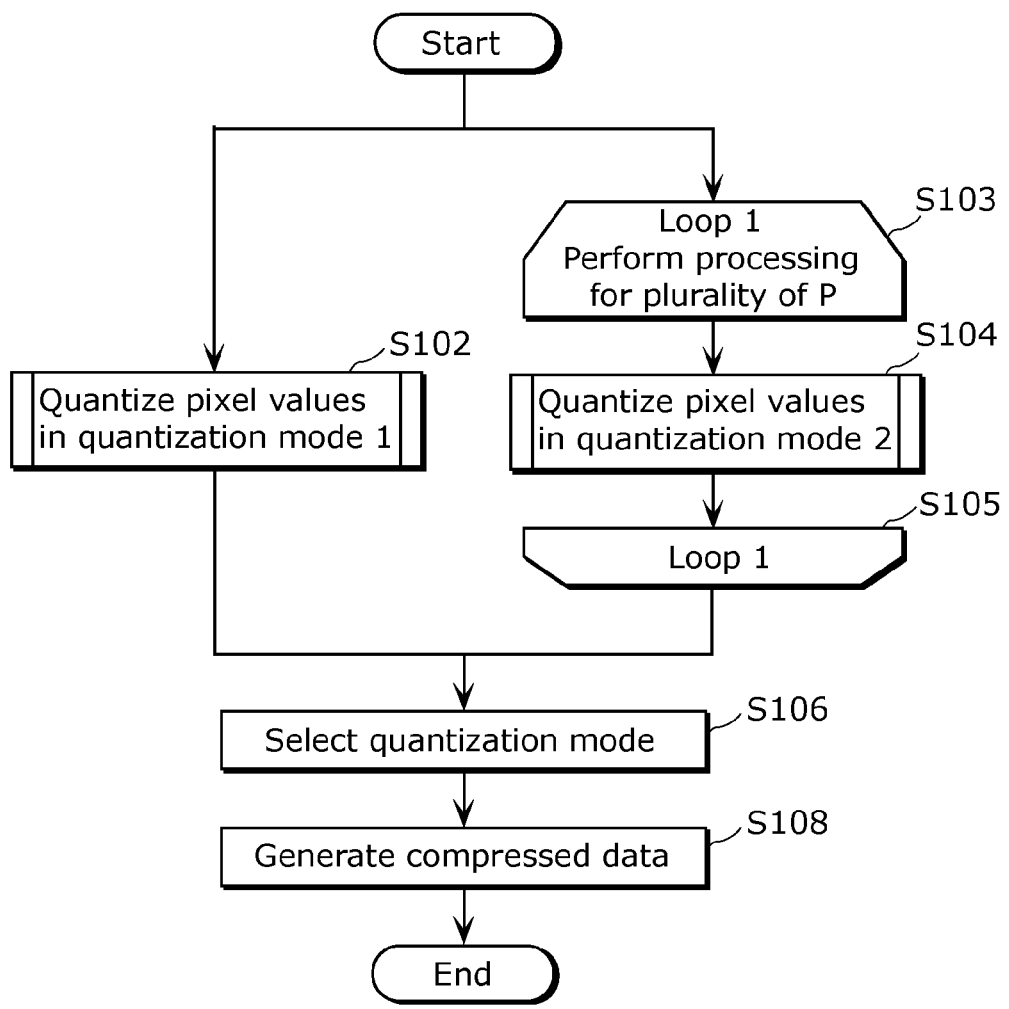
FIG. 17 is a flowchart showing an example of image data compression performed by an image compression device according to Variation 2 of an embodiment of the present invention.

FIG. 17 is a flowchart showing an example of the image data compression performed by the image compression device 200 according to Variation 2 of the above embodiment of the present invention.

As shown in FIG. 17, when the quantization in the quantization mode 2 is to be performed by the image compression device 200, the second quantization unit 220 repeats the quantization of pixel values in the quantization mode 2 and the calculation of the quantization error or the range width (S104) for a plurality of P (Loop 1: S103 through S105).

In such a manner, the second quantization unit 220 calculates the quantization error or the range width in the quantization mode 2 for a plurality of pairs of the A2 and the B2.

Then, the quantization mode selection unit 230 selects a quantization mode which makes either the quantization error or the range width smallest (S106), based on a result of the calculation by the first quantization unit 210 (S102) and a plurality of results of the calculation performed for the pairs by the second quantization unit 220 (Loop 1: S103 through S105).

Subsequently, the compressed data generation unit 240 generates the compressed data including the value A, the value B, and the quantized values, using the A1 and the B1 as the A and the B, respectively, when the quantization mode 1 is selected, and using, as the A and the B, the A2 and the B2, respectively, which make either the quantization error or the range width smallest when the quantization mode 2 is selected.

As described above, the image compression device 200 according to Variation 2 of the above embodiment of the present invention (i) calculates, for a plurality of pairs of the A2 and the B2, either the quantization error or the range width in the quantization mode 2, (ii) selects, based on the results of the calculation, a quantization mode which makes either the quantization error or the range width smallest, and (iii) generates the compressed data in the selected quantization mode. Here, in the quantization mode 2, the quantization error changes in some cases depending on the pairs of the A2 and the B2. Thus, by calculating the quantization error for the plurality of pairs of the A2 and the B2 in the quantization mode 2, the image compression device 200 can select an optimal quantization mode which reduces the quantization error. With this, even when the dynamic range is wide, it is possible to reduce the quantization error while preventing a decrease in the compression rate caused by an increased amount of data.

(Variation 3 of Embodiment)

Next, the following describes Variation 3 of the above embodiment of the present invention. In the above embodiment, the image processing apparatus 10 processes a greyscale image having one channel. In the present Variation 3, however, the image processing apparatus 10 processes image data such as video data and graphics data having a plurality of channels.

More specifically, the first quantization unit 210 assigns, to each of channels of the image data, a given number of bits to be used in the quantization, and performs the quantization in each channel according to the number of bits assigned.

The second quantization unit 220 assigns, to each of the channels, a given number of bits to be used in the quantization, and performs the quantization in each channel according to the number of bits assigned.

It is to be noted that the functions of the other processing units included in the image compression device 200 according to the present Variation 3 are the same as the functions of the other processing units included in the image compression device 200 according to the above embodiment, and thus a detailed description thereof will be omitted.

Figure 18:
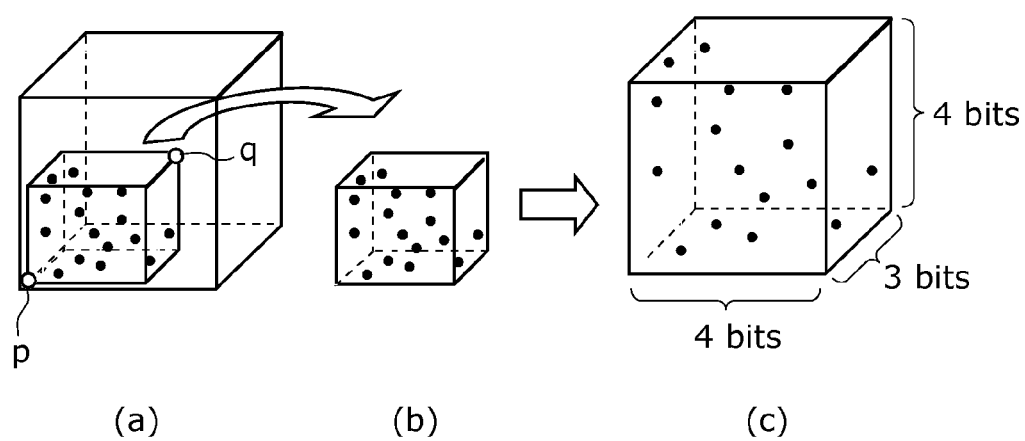
FIG. 18 is a diagram for describing compression of image data having a plurality of channels, performed by an image compression device according to Variation 3 of an embodiment of the present invention.

FIG. 18 is a diagram for describing the compression of image data having a plurality of channels, performed by the image compression device 200 according to Variation 3 of the above embodiment of the present invention.

FIG. 18 shows, as an example, three-channel image data using a bounding box. That is to say, as shown in (a) of FIG. 18, the image compression device 200 creates the bounding box by defining two pixel values p and q from the largest value and the smallest value among the components of the three channels of the image data.

Then, as shown in (b) of FIG. 18, the image compression device 200 extracts, from the three-channel image data, a range of pixel values indicated by current pixels. Subsequently, as shown in (c) of FIG. 18, the image compression device 200 normalizes each pixel value in the bounding box, and assigns bits to each channel based on a feature of the image.

More specifically, the first quantization unit 210 assigns, to each of the channels, a given number of bits to be used in the quantization, in proportion to a dynamic range width that is a range width in the channel, and performs the quantization in each channel according to the number of bits assigned.

Furthermore, the second quantization unit 220 assigns, to each of the channels, a given number of bits to be used in the quantization, in proportion to the dynamic range width in the channel, and performs the quantization in each channel according to the number of bits assigned.

For example, for image data having three channels of RGB, four bits are assigned to R, three bits to G, and four bits to B as shown in (c) of FIG. 18 according to the length of each side shown in (b) of FIG. 18 so that the total number of bits is 11. It is to be noted that the image data may have four channels like graphics data in, for example, the ARGB format in which the alpha channel is added on.

Then, the image compression device 200 performs the quantization according to the number of bits assigned to each channel.

As described above, in the quantization mode 1 and the quantization mode 2, the image compression device 200 according to Variation 2 of the above embodiment of the present invention assigns, to each of channels of image data, a given number of bits to be used in the quantization, and performs the quantization in each channel. For example, a given number of bits are assigned according to the amount of data in each channel based on a feature of the image. This makes it possible for the image compression device 200 to equalize the values of the quantization error between the channels, thereby enabling reduction in the quantization error.

Furthermore, in the quantization mode 1 and the quantization mode 2, the image compression device 200 assigns, to each of the channels, a given number of bits to be used in the quantization, in proportion to the dynamic range width in the channel, and performs the quantization in each channel. That is to say, the larger the dynamic range width, the larger the number of quantized values assigned. This makes it possible to equalize the values of the quantization error between the channels, thereby enabling reduction in the quantization error.

(Variation 4 of Embodiment)

Next, the following describes Variation 4 of the above embodiment of the present invention. In the above embodiment, the image processing apparatus 10 includes both the image compression device 200 and the image expansion device 400. In the present Variation 4, however, the image processing apparatus includes one of the image compression device 200 and the image expansion device 400.

Figure 19:
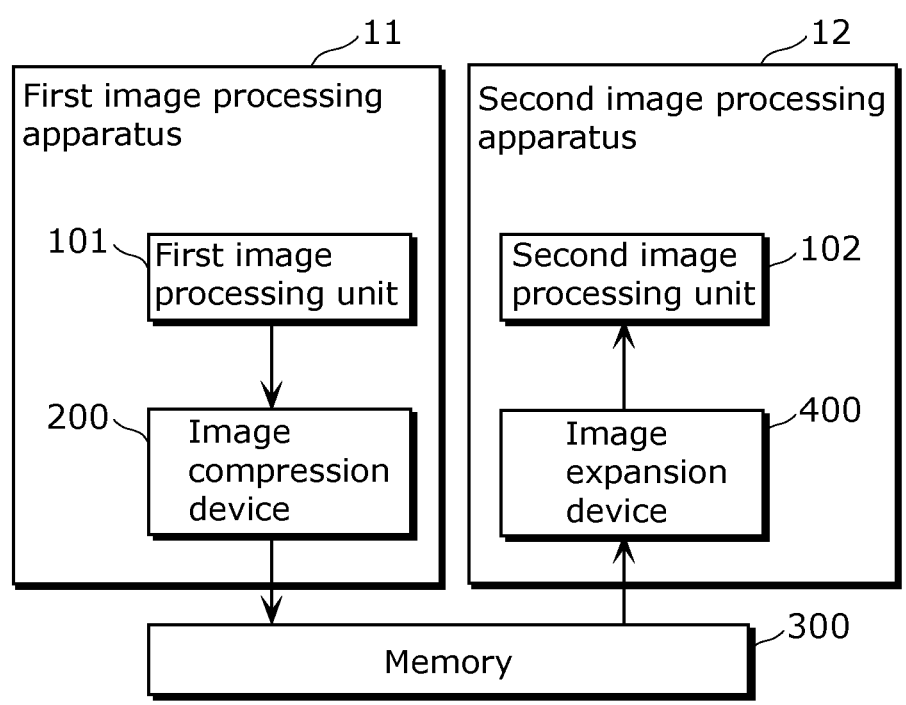
FIG. 19 shows configurations of image processing apparatuses according to Variation 4 of an embodiment of the present invention.

FIG. 19 shows configurations of image processing apparatuses according to Variation 4 of the above embodiment of the present invention.

As shown in FIG. 19, a first image processing apparatus 11 includes (i) a first image processing unit 101 which transmits image data to the image compression device 200 and (ii) the image compression device 200 which generates compressed data and writes the compressed data to the memory 300. It is to be noted that the first image processing apparatus 11 may include a memory.

Furthermore, a second image processing apparatus 12 includes (i) the image expansion device 400 which reads compressed data from the memory 300 and expands the compressed data to generate image data and (ii) a second image processing unit 102 which receives the image data from the image expansion device 400. It is to be noted that the second image processing apparatus 12 may include a memory.

That is to say, Variation 4 may be applied to a case where a plurality of image processing apparatuses are provided and exchange data among themselves. It is to be noted that the number of image processing apparatuses is not limited to one or two.

As described above, according to the present embodiment and a variation thereof, it is possible to reduce the amount of data read from and written to the memory 300 with almost no deterioration in the image quality, thereby enabling reduction in the memory capacity necessary for each image processing apparatus. Moreover, it is possible to reduce the data band necessary for reading from and writing to the memory 300, thereby enabling reduction in the bandwidth of that data band or an increase in the data transfer speed.

It is to be noted that the memory 300 may be connected via a bus. In this case, the image compression enables reduction in the bus bandwidth used by the image processing units.

(Variation 5 of Embodiment)

Next, the following describes Variation 5 of the above embodiment of the present invention. In the above embodiment, the compressed data generation unit 240 of the image compression device 200 includes the quantization mode selection unit 230. In the present Variation 5, however, the compressed data generation unit of the image compression device does not include the quantization mode selection unit.

Figure 20:
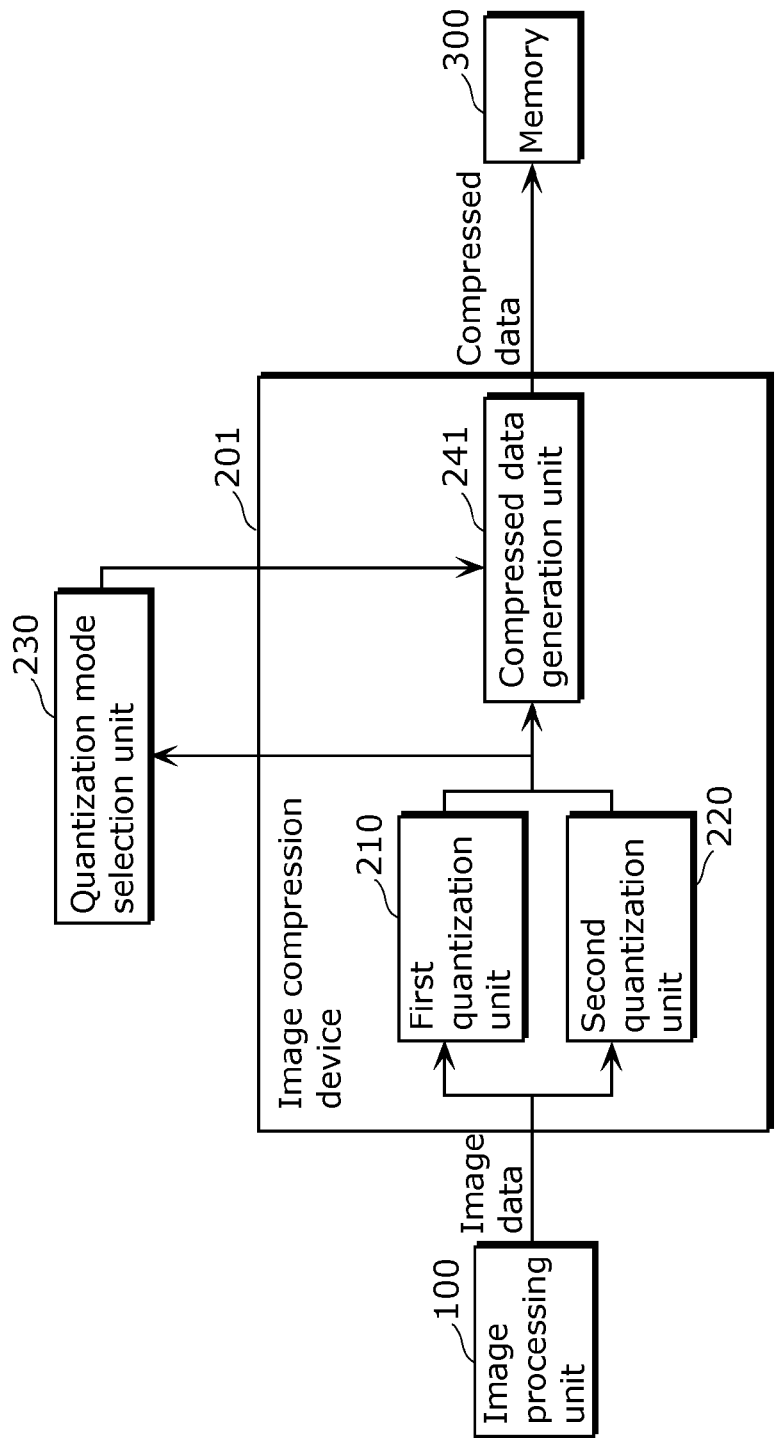
FIG. 20 shows a configuration of an image compression device according to Variation 5 of an embodiment of the present invention.

FIG. 20 shows a configuration of an image compression device 201 according to Variation 5 of the above embodiment of the present invention.

As shown in FIG. 20, the image compression device 201 includes the first quantization unit 210, the second quantization unit 220, and a compressed data generation unit 241. Here, the first quantization unit 210 and the second quantization unit 220 included in the image compression device 201 have the same functions as that of the first quantization unit 210 and the second quantization unit 220 included in the image compression device 200 according to the above embodiment, and thus a detailed description thereof will be omitted.

The compressed data generation unit 241 included in the image compression device 201 has the functions of the compressed data generation unit 240 included in the image compression device 200 of the above embodiment except the functions of the quantization mode selection unit 230.

That is to say, the first quantization unit 210 and the second quantization unit 220 perform the quantization mode 1 and the quantization mode 2, respectively, and transmit the quantization results to an external quantization mode selection unit 230. Then, the compressed data generation unit 241 generates compressed data according to the quantization mode selected by the external quantization mode selection unit 230. Here, the external quantization mode selection unit 230 has the same functions as that of the quantization mode selection unit 230 included in the image compression device 200 according to the above embodiment.

As described above, the image compression device 201 according to the present Variation 5 produces the same advantageous effect as that of the above embodiment even without having the functions of the quantization mode selection unit 230 like the image compression device 200 according to the above embodiment.

(Variation 6 of Embodiment)

Next, the following describes Variation 6 of the above embodiment of the present invention. In the above embodiment, the first quantization unit 210 performs the quantization in one range that is a range from the A1 to the B1 inclusive, using the smallest value and the largest value among a plurality of pixel values as the A1 and the B1, respectively. However, the way of defining the A1 and the B1 is not limited to this.

For example, the first quantization unit 210 may perform the quantization in one range that is the range from the A1 to the B1 inclusive, using, as the A1, the smallest value among the plurality of pixel values plus some degree of error, and using, as the B1, the largest value among the plurality of pixel values plus some degree of error. Furthermore, the first quantization unit 210 may perform the quantization in a range indicated by the A1 and the B1, using, as the A1 and the B1, two values that define a range including a range from the smallest value to the largest value among the plurality of pixel values, inclusive.

Moreover, the first quantization unit 210 may obtain the A1 and the B1 in the following manner and perform the quantization in a range indicated by the A1 and the B1.

Figure 21:
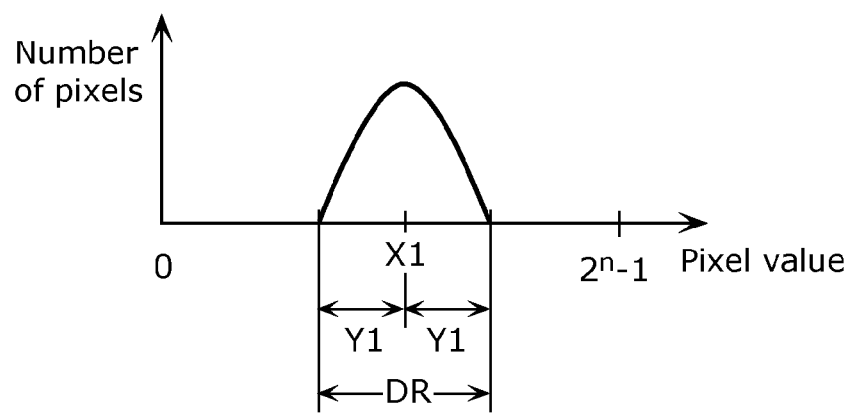
FIG. 21 is a diagram for describing quantization performed by a first quantization unit according to Variation 6 of an embodiment of the present invention.

FIG. 21 is a diagram for describing the quantization performed by the first quantization unit 210 according to Variation 6 of the above embodiment of the present invention.

As shown in FIG. 21, the first quantization unit 210 obtains, as X1, a middle value between the smallest value and the largest value among a plurality of pixel values, and obtains, as Y1, the distance from the middle value to either the smallest value or the largest value. Then, the first quantization unit 210 defines the A1 and the B1 using the X1 and the Y1.

By doing so, the first quantization unit 210 can calculate the dynamic range DR using the A1 and the B1, and thus can quantize each pixel value in the dynamic range DR.

(Variation 7 of Embodiment)

Next, the following describes Variation 7 of the above embodiment of the present invention. In the above embodiment, the second quantization unit 220 performs the quantization in two ranges that are (i) a range from 0 to the B2 inclusive and (ii) a range from the A2 to $2^n-1$ inclusive, using, as the A2, the smallest value among pixel values from the P to $2^n-1$ inclusive and using, as the B2, the largest value among pixel values no less than 0 and less than the P. However, the way of defining the A2 and the B2 is not limited to this.

For example, the second quantization unit 220 may perform the quantization in the above two ranges using, as the A2, the above-mentioned smallest value plus some degree of error, and using, as the B2, the above-mentioned largest value plus some degree of error. Furthermore, the second quantization unit 220 may perform the quantization in ranges indicated by the A2 and the B2, using, as the A2 and the B2, two values that define ranges including the above two ranges.

Moreover, the second quantization unit 220 may obtain the A2 and the B2 in the following manner and perform the quantization in ranges indicated by the A2 and the B2.

Figure 22:
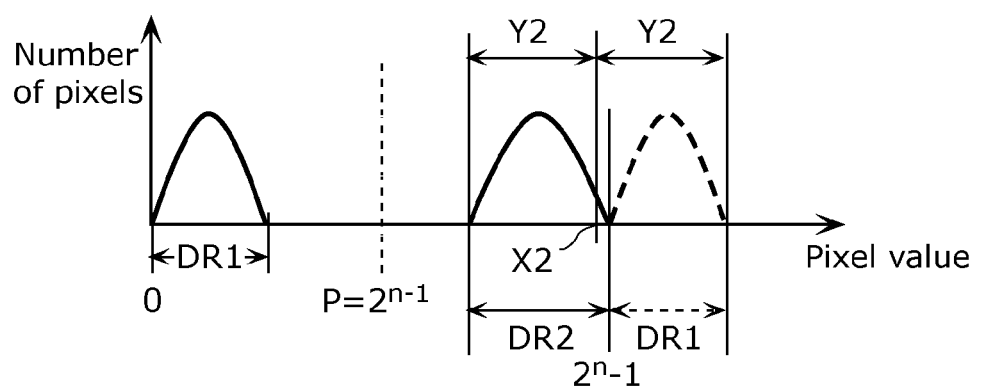
FIG. 22 is a diagram for describing quantization performed by a second quantization unit according to Variation 7 of an embodiment of the present invention.

FIG. 22 is a diagram for describing the quantization performed by the second quantization unit 220 according to Variation 7 of the above embodiment of the present invention.

As shown in FIG. 22, the second quantization unit 220 obtains, as X2, a middle value of a range obtained by connecting (i) a range from the smallest value among the pixel values from the P to $2^n-1$ inclusive to $2^n-1$ inclusive and (ii) a range from 0 to the largest values among the pixel values no less than 0 and less than the P, inclusive. The second quantization unit 220 also obtains, as Y2, the distance from the middle value to either the smallest value or the largest value. Then, the second quantization unit 220 defines the A2 and the B2 using the X2 and the Y2.

By doing so, the second quantization unit 220 can calculate the dynamic ranges DR1 and DR2 using the A2 and the B2, and thus can quantize each pixel value in the dynamic ranges DR1 and DR2.

It is to be noted that in the above embodiment and variations thereof, the image compression device compresses image data for each image block which includes a plurality of pixels included in the image data. However, when the number of pixels included in the image data is small, the image compression device may compress the image data as a whole without dividing the image data into image blocks. Furthermore, the image compression device may divide the image data into image blocks in various sizes and compress the image data for each image block.

Moreover, in the above embodiment and variations thereof, the values A1 and B1 are two values satisfying A1≤B1, and the values A2 and B2 are two values satisfying B2<A2. However, the values A1 and B1 may be two values satisfying A1<B1, and the values A2 and B2 may be two values satisfying B2≤A2. Furthermore, the values A1 and B1 may be two values satisfying A1<B1, and the values A2 and B2 may be two values satisfying B2<A2

Furthermore, the present invention can be implemented not only as the image compression device 200 or 201, the image expansion device 400, and the image processing apparatus, but also as an integrated circuit including each processing unit included in the image compression device 200 in FIG. 2A, the image compression device 201 in FIG. 20, the image expansion device 400 in FIG. 5, the image processing apparatus 10 in FIG. 1, the first image processing apparatus 11 in FIG. 19, or the second image processing apparatus 12 in FIG. 19. It is also possible to provide a system LSI combined with a different function. In this case, it is possible to reduce the memory capacity and/or the memory bandwidth within the system LSI, thereby enabling reduction in the manufacturing cost. Moreover, a digital image processing appliance can be provided by using the system LSI and combining with a different function. Specific examples include a television receiver, a recorder, a mobile phone, and a video camera. In this case, it is possible to reduce the external memory capacity necessary for providing such an appliance, and reduce the power consumption as a result of reduction in the used bandwidth within the LSI. Thus, reduction in the manufacturing cost of the appliance and/or improvement in the performance of the appliance can be expected.

Although the integrated circuit here is referred to as the LSI or the system LSI, it is also referred to as an IC, a super LSI, and an ultra LSI depending on the degree of integration.

Moreover, the ways to implement an integrated circuit are not limited to an LSI, and a special circuit or a general purpose processor may also be used. A field programmable gate array (FPGA) that can be programmed after manufacturing an LSI or a reconfigurable processor that allows reconfiguration of connection or setting of circuit cells in the LSI can be used for the same purpose.

Furthermore, if a technology for implementing an integrated circuit that supersedes the LSI is introduced as a result of development in the semiconductor technology or another derivative technology, integration of the functional blocks can surely be implemented using that technology. Biotechnology is one such possibility.

In addition, the present invention can also be implemented as an image compression method, an image expansion method, or an image processing method which includes, as steps, characteristic processing of each processing unit included in the image compression device 200 or 201, the image expansion device 400, or the image processing apparatus. Furthermore, the present invention can also be implemented as a program which causes a computer to execute the characteristic processing included in the image compression method, the image expansion method, or the image processing method. Needless to say, such a program can be distributed via a recording medium such as a CD-ROM and a transmission medium such as the Internet.

That is to say, in the above embodiment and variations thereof, each structural element may be implemented with dedicated hardware or implemented through execution of a software program suitable for the structural element. Each structural element may be implemented through a program execution unit, such as a CPU or a processor, reading and executing a software program recorded on a recording medium such as a hard disk or a semiconductor memory.

Here, the software for implementing the image compression device in the above embodiment and variations thereof is a program as follows: That is, it is a program for an image compression method for compressing image data, the program causing a computer to execute: performing a quantization mode 1 to quantize a plurality of pixel values included in the image data using two values A1 and B1 where A1<B1, in one range defined by the A1 and the B1; performing a quantization mode 2 to quantize the pixel values using two values A2 and B2 where A2>B2, in two ranges defined by the A2 and the B2; and generating compressed data including a value A, a value B, and quantized values of the pixel values quantized in a selected quantization mode, wherein in the generating, the compressed data is generated using: the A1 as the A when the quantization mode 1 is selected; the A2 as the A when the quantization mode 2 is selected; the B1 as the B when the quantization mode 1 is selected; and the B2 as the B when the quantization mode 2 is selected.

Furthermore, the software for implementing the image expansion device in the above embodiment and variations thereof is a program as follows: That is, it is a program for an image expansion method for expanding the compressed data that is image data compressed by the image compression device, the program causing the program for causing a computer to execute: determining, between the quantization mode 1 and the quantization mode 2, a quantization mode corresponding to quantized values included in the compressed data, based on a magnitude relationship between the A and the B included in the compressed data; and performing inverse quantization on the quantized values to obtain pixel values, in the determined quantization mode.

Moreover, the software for implementing the image processing apparatus in the above embodiment and variations thereof is a program as follows: That is, it is a program that causes a computer to execute: causing the image compression device to (i) compress the image data received from the image processing unit, to generate compressed data, and (ii) write the compressed data to a memory; and causing the image expansion device to (i) read, from the memory, the compressed data written in the memory, (ii) expand the compressed data to generate image data, and (iii) transmit the image data to the image processing unit.

Although the image compression device, the image expansion device, the image processing apparatus, and methods of the same according to an aspect of the present invention have been described based on the above embodiment and variations thereof, the present invention is not limited to such an embodiment and variations thereof. The scope of the present invention is indicated not by the above description but by the claims, and is intended to include all the meaning equivalent to the claims and all the modifications within the scope of the claims. Furthermore, the scope of the present invention is intended to include what is conceivable to those skilled in the art without materially departing from the novel teachings and advantages of the present invention, such as modifications to the above embodiment and variations thereof and embodiments achieved by combining the structural elements in different embodiments and variations.

INDUSTRIAL APPLICABILITY

The image compression method and device according the present invention can reduce the amount of data with almost no deterioration in the image quality after the compression, and are useful in, for example, reducing the cost of and improving the performance of a system LSI and an image processing appliance for which the image compression method and device are used. The image compression method and device are applicable to many types of digital AV appliances because the method and device enable compression of grey-scale images and color images in such formats as the RGB format and the YUV format. Moreover, the image compression method and device are applicable to a graphics processing apparatus such as a graphics engine because the method and device enable compression of graphics data in such a format as the ARGB format in which the alpha channel is added on.

REFERENCE SIGNS LIST 10 mage processing apparatus
11 First image processing apparatus
12 Second image processing apparatus
100 Image processing unit
101 First image processing unit
102 Second image processing unit
200, 201 Image compression device
210 First quantization unit
211 First quantized value calculation unit
212 Smallest value calculation unit
213 Largest value calculation unit
214 Quantization unit
215 Quantization error calculation unit
220 Second quantization unit
221 Second quantized value calculating unit
222 Range determination unit
223 Smallest value calculation unit
224 Largest value calculation unit
225 Quantized value assigning unit
226 Quantization unit
227 Quantization error calculation unit
230 Quantization mode selection unit
240, 241 Compressed data generation unit 300 Memory
400 Image expansion device
410 Quantization mode determination unit
420 Inverse quantization unit
421 First inverse quantization unit
422 Second inverse quantization unit
423 Quantization mode selection unit

The invention claimed is:

1. An image compression device which compresses image data, comprising:
    a first quantization unit configured to perform a quantization mode 1 to quantize a plurality of pixel values included in the image data using two values A1 and B1 where A1<B1, in one range defined by the A1 and the B1;
    a second quantization unit configured to perform a quantization mode 2 to quantize the pixel values using two values A2 and B2 where A2>B2, in two ranges defined by the A2 and the B2; and
    a compressed data generation unit configured to generate compressed data including a value A, a value B, and quantized values of the pixel values quantized in a selected quantization mode,
    wherein the compressed data generation unit is configured to generate the compressed data using: the A1 as the A when the quantization mode 1 is selected; the A2 as the A when the quantization mode 2 is selected; the B1 as the B when the quantization mode 1 is selected; and the B2 as the B when the quantization mode 2 is selected.

2. The image compression device according to claim 1,
    wherein the first quantization unit is configured to perform the quantization mode 1 to quantize the pixel values in the one range that is a range from the A1 to the B1 inclusive.

3. The image compression device according to claim 1,
    wherein the second quantization unit is configured to perform the quantization mode 2 to quantize the pixel values in the two ranges that are (i) a range from 0 to the B2 inclusive and (ii) a range from the A2 to $2^n-1$ inclusive, the pixel values being n-bit values.

4. The image compression device according to claim 1,
    wherein the compressed data generation unit:
    includes a quantization mode selection unit configured to select, between the quantization mode 1 and the quantization mode 2, a quantization mode to be used in the quantization; and
    is configured to generate the compressed data according to the selected quantization mode.

5. The image compression device according to claim 4,
    wherein the first quantization unit is further configured to calculate a quantization error that has occurred in the quantization mode 1,
    the second quantization unit is further configured to calculate a quantization error that has occurred in the quantization mode 2, and
    the quantization mode selection unit is configured to select, as the quantization mode to be used in the quantization, a quantization mode with a smaller quantization error, based on results of the quantization error calculation by the first quantization unit and the second quantization unit.

6. The image compression device according to claim 4,
    wherein the first quantization unit is further configured to calculate a first range width by subtracting the A1 from the B1, the first range width being a range width in the quantization mode 1, the second quantization unit is further configured to calculate a second range width by adding the B2 and a value obtained by subtracting the A2 from $2^n-1$ when the pixel values are n-bit pixel values, the second range width being a range width in the quantization mode 2, and the quantization mode selection unit is configured to select, as the quantization mode to be used in the quantization, a quantization mode corresponding to a smaller one of the first range width and the second range width.

7. The image compression device according to claim 5, wherein the second quantization unit is configured to calculate, for a plurality of pairs of the A2 and the B2, either the quantization error or the range width in the quantization mode 2, the quantization mode selection unit is configured to select, as the quantization mode to be used in the quantization, a quantization mode which makes either the quantization error or the range width smallest, based on the result of the calculation by the first quantization unit and results of the calculation performed for the pairs by the second quantization unit, and when the quantization mode 2 is selected, the compressed data generation unit is configured to generate the compressed data including the A, the B, and the quantized values of the pixel values quantized in the quantization mode 2, using, as the A and the B, the A2 and the B2, respectively, that make either the quantization error or the range width smallest.

8. The image compression device according to claim 1, wherein the first quantization unit is configured to perform the quantization mode 1, using, as the A1 and the B1, a smallest pixel value and a largest pixel value among the pixel values, respectively, and the second quantization unit is configured to perform the quantization mode 2, using, as the B2, a largest pixel value in one of two ranges into which smaller ones of the pixel values are grouped, and using, as the A2, a smallest pixel value in the other range into which larger ones of the pixel values are grouped.

9. The image compression device according to claim 1, wherein the second quantization unit is configured to assign quantized values to each of the two ranges in which the quantization mode 2 is to be performed, and perform the quantization in each range using the quantized values assigned.

10. The image compression device according to claim 9, wherein the second quantization unit is configured to assign the quantized values to each of the two ranges in proportion to widths of the two ranges, and perform the quantization in each range using the quantized values assigned.

11. The image compression device according to claim 1, wherein the image data is image data having a plurality of channels, the first quantization unit is configured to assign, to each of the channels, a given number of bits to be used in the quantization, and perform the quantization in each channel according to the number of bits assigned, and the second quantization unit is configured to assign, to each of the channels, a given number of bits to be used in the quantization, and perform the quantization in each channel according to the number of bits assigned.

12. The image compression device according to claim 11, wherein the first quantization unit is configured to assign, to each of the channels, a given number of bits to be used in the quantization, in proportion to a dynamic range width that is a range width in the channel, and perform the quantization in each channel according to the number of bits assigned, and the second quantization unit is configured to assign, to each of the channels, a given number of bits to be used in the quantization, in proportion to the dynamic range width in the channel, and perform the quantization in each channel according to the number of bits assigned.

13. The image compression device according to claim 1, wherein, for each of image blocks which includes a plurality of pixels included in the image data, the first quantization unit is configured to perform the quantization mode 1 to quantize the pixel values in the image block, the second quantization unit is configured to perform, for each image block, the quantization mode 2 to quantize the pixel values, and the compressed data generation unit is configured to generate the compressed data for each image block.

14. An image expansion device which expands the compressed data that is image data compressed by the image compression device according to claim 1, the image expansion device comprising:

a quantization mode determination unit configured to determine, between the quantization mode 1 and the quantization mode 2, a quantization mode corresponding to quantized values included in the compressed data, based on a magnitude relationship between the A and the B included in the compressed data; and an inverse quantization unit configured to perform inverse quantization on the quantized values to obtain pixel values, in the determined quantization mode.

15. An integrated circuit which expands the compressed data that is image data compressed by the image compression device according to claim 1, the integrated circuit comprising:

a quantization mode determination unit configured to determine, between the quantization mode 1 and the quantization mode 2, a quantization mode corresponding to quantized values included in the compressed data, based on a magnitude relationship between the A and the B included in the compressed data; and an inverse quantization unit configured to perform inverse quantization on the quantized values to obtain pixel values, in the determined quantization mode.

16. An image processing apparatus comprising:

an image compression device which compresses image data, the image compression device comprising:

a first quantization unit configured to perform a quantization mode 1 to quantize a luralit of pixel values included in the image data using two values A1 and B1 where A1<B1 in one range defined by the A1 and the B1;

a second quantization unit configured to perform a quantization mode 2 to quantize the pixel values using two values A2 and B2 where A2>B2, in two ranges defined by the A2 and the B2; and a compressed data generation unit configured to generate compressed data including a value A, a value B, and quantized values of the pixel values quantized in a selected quantization mode, wherein the compressed data generation unit is configured to generate the compressed data using: the A1 as the A when the quantization mode 1 is selected; the A2 as the A when the quantization mode 2 is selected; the B1 as the B when the quantization mode 1 is selected; and the B2 as the B when the quantization mode 2 is selected;

the image expansion device according to claim 14; and an image processing unit configured to transmit image data to the image compression device and receive image data from the image expansion device, wherein the image compression device compresses the image data received from the image processing unit, to generate compressed data, and writes the compressed data to a memory, and the image expansion device reads, from the memory, the compressed data written in the memory, expands the compressed data to generate image data, and transmits the image data to the image processing unit.

17. An integrated circuit which compresses image data, comprising:

a first quantization unit configured to perform a quantization mode 1 to quantize a plurality of pixel values included in the image data using two values A1 and B1 where A1<B1, in one range defined by the A1 and the B1;

a second quantization unit configured to perform a quantization mode 2 to quantize the pixel values using two values A2 and B2 where A2>B2, in two ranges defined by the A2 and the B2; and a compressed data generation unit configured to generate compressed data including a value A, a value B, and quantized values of the pixel values quantized in a selected quantization mode, wherein the compressed data generation unit is configured to generate the compressed data using: the A1 as the A when the quantization mode 1 is selected; the A2 as the A when the quantization mode 2 is selected; the B1 as the B when the quantization mode 1 is selected; and the B2 as the B when the quantization mode 2 is selected.

18. An image compression method for compressing image data, comprising:

using a first quantization unit for performing a quantization mode 1 to quantize a plurality of pixel values included in the image data using two values A1 and B1 where A1<B1, in one range defined by the A1 and the B1;

a second quantization unit for performing a quantization mode 2 to quantize the pixel values using two values A2 and B2 where A2>B2, in two ranges defined by the A2 and the B2; and using a compressed data generation unit for generating compressed data including a value A, a value B, and quantized values of the pixel values quantized in a selected quantization mode, wherein in the generating, the compressed data is generated using: the A1 as the A when the quantization mode 1 is selected; the A2 as the A when the quantization mode 2 is selected;

the B1 as the B when the quantization mode 1 is selected; and the B2 as the B when the quantization mode 2 is selected.

19. A non-transitory computer-readable recording medium for use in a computer, the recording medium having a computer program recorded thereon for causing the computer to execute the image compression method according to claim 18.

* * * * *